US011751105B2

(12) United States Patent
Jin et al.

(10) Patent No.: US 11,751,105 B2
(45) Date of Patent: Sep. 5, 2023

(54) NETWORK HANDOVER METHOD AND APPARATUS

(71) Applicant: HUAWEI TECHNOLOGIES CO., LTD., Shenzhen (CN)

(72) Inventors: Weisheng Jin, Shanghai (CN); Huan Li, Shanghai (CN); Wei Lu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 282 days.

(21) Appl. No.: 17/317,093

(22) Filed: May 11, 2021

(65) Prior Publication Data

US 2021/0266798 A1 Aug. 26, 2021

Related U.S. Application Data

(63) Continuation of application No. PCT/CN2019/117356, filed on Nov. 12, 2019.

(30) Foreign Application Priority Data

Nov. 12, 2018 (CN) .......................... 201811341605.1

(51) Int. Cl.
*H04W 36/00* (2009.01)
*H04W 76/12* (2018.01)
(Continued)

(52) U.S. Cl.
CPC ....... *H04W 36/0016* (2013.01); *H04W 60/04* (2013.01); *H04W 76/11* (2018.02); *H04W 76/12* (2018.02)

(58) Field of Classification Search
CPC . H04W 36/0016; H04W 76/12; H04W 76/11; H04W 60/04

(Continued)

(56) References Cited

U.S. PATENT DOCUMENTS

| 2010/0046477 A1* | 2/2010 | Marin ............... H04W 36/0072 370/332 |
| 2013/0258854 A1* | 10/2013 | Rajagopalan ......... H04W 36/22 370/235 |

(Continued)

FOREIGN PATENT DOCUMENTS

| CN | 105813153 A | 7/2016 |
| CN | 107148061 A | 9/2017 |

(Continued)

OTHER PUBLICATIONS

"Discussion on MOBIKE in untrusted non-3GPP access", Nokia, Nokia Shanghai Bell, ((SA WG2 Meeting #127bis, S2-184899)), Jun. 1, 2018, total 4 pages.

(Continued)

*Primary Examiner* — Nghi H Ly
(74) *Attorney, Agent, or Firm* — HAUPTMAN HAM, LLP

(57) ABSTRACT

This application provides a network handover method and an apparatus. Before a terminal device is handed over from a first network to a second network, the terminal device sets up a first tunnel to a first interworking device, where a communication identifier, of the terminal device, in the first tunnel is a first identifier the first identifier is an identifier used in the first network by the terminal device, and the first interworking device is an interface device in the first network and oriented toward a network other than the first network. After the terminal device is handed over from the first network to the second network, the terminal device sends an update request to the first interworking device, where the update request is to update the communication identifier to a second identifier, and the second identifier is an identifier used in the second network by the terminal device.

20 Claims, 9 Drawing Sheets

(51) Int. Cl.
*H04W 76/11* (2018.01)
*H04W 60/04* (2009.01)

(58) Field of Classification Search
USPC ....... 370/331, 328, 329, 338, 341, 345, 350; 455/436, 443
See application file for complete search history.

(56) References Cited

U.S. PATENT DOCUMENTS

| | | | |
|---|---|---|---|
| 2013/0258983 A1 | 10/2013 | Zhao et al. | |
| 2016/0262058 A1* | 9/2016 | Jeong | H04W 4/025 |
| 2016/0286447 A1* | 9/2016 | Sharma | H04W 76/34 |
| 2017/0105150 A1* | 4/2017 | Olsson | H04W 36/14 |
| 2018/0199279 A1 | 7/2018 | Baek et al. | |
| 2018/0270894 A1 | 9/2018 | Park et al. | |

FOREIGN PATENT DOCUMENTS

| | | |
|---|---|---|
| CN | 108337705 A | 7/2018 |
| CN | 108632953 A | 10/2018 |
| CN | 111182591 A | 5/2020 |
| WO | 2017080266 A1 | 5/2017 |
| WO | 2018088836 A1 | 5/2018 |

OTHER PUBLICATIONS

Yuankai Jiang,: "The Design and Implementation of GGSN Gateway Used in Pocket Switch Domain of Mobile Telecommunication Network", 2010, total 64 pages.

3GPP TSG-SA WG2 Meeting #131, S2-1901802: "Handover procedure between PLMN and SNPN", Huawei, HiSilicon, Santa Cruz—Tenerife, Feb. 25-Mar. 1, 2019, total 5 pages.

SA WG2 Meeting #S2-129,S2-1810074,FS_Vertical_LAN: Access to PLMN/NPN services via N3IWF, Qualcomm Incorporated, Nokia, Nokia Shanghai Bell, Ericsson, Oct. 15-19, 2018, Dongguan, P.R. China, total 9 pages.

3GPP TSG-SA WG2 Meeting #127, S2-184469: "Propose to add the network Requested PDU Session Release procedure via Untrusted non-3GPP access", Huawei, HiSilicon, Sanya, China, Apr. 16-Apr. 20, total 3 pages.

3GPP TSG-SA WG2 Meeting #128bis, S2-1810250, Excluding sensitive information to be sent in clear, Ericsson, Dongguan, P.R. China, Oct. 15-19, 2018, total 23 pages.

Notice of Allowance issued in corresponding Chinese Application No. 201811341605.1, dated May 7, 2021, pp. 1-5.

Chinese Search Report issued in corresponding Chinese Application No. 201811341605.1, dated Sep. 26, 2020, pp. 1-4.

Chinese Office Action issued in corresponding Chinese Application No. 201811341605.1, dated Oct. 9, 2020, pp. 1-4.

International Search Report issued in corresponding International Application No. PCT/CN2019/117356, dated Feb. 1, 2020, pp. 1-10.

3GPP TR 23.734 V0.3.0:"3rd Generation Partnership Project;Technical Specification Group Services and System Aspects; Study on 5GS Enhanced support of Vertical and LAN Services (Release 16)", Oct. 2018, total 97 pages.

3GPP TS 23.502 V15.3.0 (Sep. 2018), 3rd Generation Partnership Project;Technical Specification Group Services and System Aspects; Procedures for the 5G System; Stage 2 (Release 15), dated Sep. 17, 2018, total 329 pages.

SA WG2 Meeting #129 , S2-1810945, Using TCP for reliable NAS transport between UE and N31WF, Motorola Mobility, Lenovo, Broadcom, Oct. 15-19, 2018, Dongguan, P.R. China, total 7 pages.

European Search Report issued in corresponding European Application No. 19883805.4, dated Dec. 17, 2021, pp. 1-6, European Patent Office, Munich, Germany.

* cited by examiner

NETWORK HANDOVER METHOD AND APPARATUS

CROSS-REFERENCE TO RELATED APPLICATIONS

This application is a continuation of International Application No. PCT/CN2019/117356, filed on Nov. 12, 2019, which claims priority to Chinese Patent Application No. 201811341605.1, filed on Nov. 12, 2018. The disclosures of the aforementioned applications are hereby incorporated by reference in their entireties.

TECHNICAL FIELD

This application relates to the communications field, and more specifically, to a network handover method and an apparatus.

BACKGROUND

With development of communications technologies, networks using a plurality of access technologies can already be provided, and a terminal device may be handed over between different networks based on a requirement (for example, based on communication quality).

In a current technology, after a terminal device is handed over from a source network to a target network, to perform service access in the target network, the terminal device needs to register and set up a communication connection with the target network. This process causes a relatively long time for network handover. Particularly, if the terminal device performs service access in the source network and performs handover during the access, if a handover time is relatively long, a connection between the terminal device and an external device (for example, a server) may be disconnected, and service continuity cannot be maintained.

How to optimize a network handover process becomes an urgent problem to be resolved.

SUMMARY

This application provides a network handover method and apparatus, to optimize a network handover process.

According to a first aspect, a network handover method is provided, and includes: Before a terminal device is handed over from a first network to a second network, the terminal device sets up a first tunnel to a first interworking device. A communication identifier, in the first tunnel, of the terminal device is a first identifier, and the first identifier is an identifier used in the first network by the terminal device. The first interworking device is an interface device that is in the first network and oriented toward a network other than the first network. The terminal device obtains a second identifier after the terminal device is handed over from the first network to the second network, and sends an update request to the first interworking device, where the update request is used to request to update the communication identifier to the second identifier, and the second identifier is an identifier used in the second network by the terminal device.

According to the network handover method provided in this application, the terminal device sets up a tunnel to the interworking device of the first network when the terminal device is in the first network, so that after the terminal device is handed over to the second network, the terminal device can communicate through the tunnel, provided that a local identifier used in the tunnel by the terminal device is updated. In this way, network handover duration can be reduced, and a network handover process can be optimized.

Optionally, the first tunnel is used for the network handover of the terminal device.

That "the first tunnel is used for the network handover of the terminal device" may be understood as that before the terminal device is handed over from the first network to the second network, the terminal device does not receive downlink data through the first tunnel, and the first interworking device does not send the downlink data of the terminal device through the first tunnel. After the terminal device is handed over from the first network to the second network, the terminal device receives downlink data through the first tunnel, and the first interworking device sends the downlink data of the terminal device through the first tunnel.

Alternatively, that "the first tunnel is used for the network handover of the terminal device" may be understood as that the terminal device may transmit, through the first tunnel, an instruction or signaling related to the network handover process, for example, a request message or a response message used when pre-registration with or pre-authentication for the second network is performed.

Optionally, the first network may be one of a public land mobile network (PLMN) or a non-public network (NPN), and the second network may be the other one of the public land mobile network (PLMN) or the non-public network (NPN).

Optionally, the first identifier includes a 5G globally unique temporary identity 5G-GUTI of the terminal device.

Alternatively, the first identifier includes an IP address obtained in the first network by the terminal device.

The "IP address obtained in the first network by the terminal device" may be understood as an IP address obtained when the terminal device sets up a session with a forwarding device of the first network by using an access network device of the first network.

Alternatively, the "IP address obtained in the first network by the terminal device" may be understood as another IP address obtained in the first network by the terminal device.

Optionally, that "the first interworking device is an interface device that is in the first network and oriented toward a network other than the first network" may be understood as: The first interworking device is a device that is in the first network and that provides a communication service for a terminal device in the network other than the first network.

Optionally, that "the second interworking device is an interface device that is in the second network and oriented toward a network other than the second network" may be understood as: The second interworking device is a device that is in the second network and that provides a communication service for a terminal device in the network other than the second network.

Optionally, the method further includes: Before the terminal device is handed over from the first network to the second network, the terminal device sends a first message to an access management device of the second network through a second interworking device, where the first message is used to request to register the terminal device with the second network, and the second interworking device is an interface device that is in the second network and oriented toward a network other than the second network. The terminal device receives a response message from the access management device of the second network through the second interworking device, where the response message includes a temporary identifier allocated by the access management device of the second network to the terminal device. When the terminal device is handed over from the first network to the second network, the terminal device sends a second message to the access management device of the second network, where the second message is used to request to register the terminal device with the second network, and the second message includes the temporary identifier.

The first message may include a device identifier of the terminal device, and the device identifier may include any one of the following identifiers: a media access control (media access control. MAC) address, a mobile phone number, an international mobile subscriber identity (international mobile subscriber identity, IMSI), or an international mobile equipment identity (international mobile equipment identity, IMEI).

According to the network handover method provided in this application, when the terminal device is in the first network, the terminal device performs a registration process for the second network by using the interworking device of the second network, so that the terminal device can be registered with the second network before the terminal device is handed over to the NPN. In this way, handover processing duration caused by registration after the network handover can be reduced, and the network handover process can be further optimized.

Optionally, the method further includes: Before the terminal device is handed over from the first network to the second network, the terminal device sends a third registration request to an access management device of the first network through the first interworking device.

Optionally, the third registration request includes pre-handover indication information, and the pre-handover indication information is used to indicate that the terminal device needs to be handed over to the second network.

That "the terminal device needs to be handed over to the second network" may be understood as: The terminal device may be subsequently handed over to the second network, but has not performed network handover when sending the third registration request.

Therefore, the access management device of the first network may determine, based on the pre-handover indication information, that the terminal device has not completed the network handover, or in other words, determine that the terminal device is still located in the first network, so that a policy and control that are related to a terminal location may not be changed. For example, a location-related policy update may not be performed, and location-related service control may not be changed.

Optionally, the method further includes: Before the terminal device is handed over from the first network to the second network, the terminal device sends a channel setup request, where the channel setup request is used to request to set up a first channel between the first interworking device and a forwarding device of the first network, and the first channel belongs to a session of the terminal device.

Before the network handover, the channel between the interworking device and the forwarding device is set up for a session that is performing service access, so that data of a service that is being accessed by the terminal device can be cached by using the interworking device, and the data can be sent to the terminal device after the handover is completed. In this way, a data loss can be avoided, and the network handover process can be further optimized.

Optionally, the method further includes: The terminal device sends a first cache indication to the first interworking device, where the first cache indication is used to indicate the first interworking device to cache received first downlink data of the first channel.

The "channel" may also be referred to as a session channel.

In addition, the first channel may be a channel between the first interworking device and the forwarding device of the first network in a session between the terminal device and the forwarding device of the first network.

Therefore, a loss, of the first downlink data, caused by the handover of the terminal device can be avoided, and service continuity can be further ensured.

Optionally, the method further includes: The terminal device sends trigger information to the forwarding device of the first network, where the trigger information is used to indicate the forwarding device of the first network to send downlink data of the terminal device through the first channel.

In this way, the service continuity can be further ensured.

Optionally, the method further includes: The terminal device sends a reservation indication, where the reservation indication is used to request to reserve a second channel, the second channel is a channel between an access device of the first network and the forwarding device of the first network, and the first channel and the second channel belong to a same session.

In addition, the second channel may be a channel between the access device of the first network and the forwarding device of the first network in the session between the terminal device and the forwarding device of the first network.

In this way, the service continuity can be further ensured.

Optionally, the method further includes: Before the terminal device is handed over from the first network to the second network, the terminal device sends a forwarding tunnel setup request, where the forwarding tunnel setup request is used to request to set up, between the access device of the first network and the first interworking device, a forwarding tunnel for transmitting the downlink data of the terminal device.

Before the network handover, the forwarding tunnel between the access device and the interworking device is set up for the session that is performing service access, so that the data of the service that is being accessed by the terminal device can be cached by using the interworking device, and the data can be sent to the terminal device after the handover is completed. In this way, the data loss can be avoided, and the network handover process can be further optimized.

Therefore, the loss, of the first downlink data, caused by the handover of the terminal device can be avoided, and the service continuity can be further ensured.

Optionally, the tunnel setup request includes a measurement report of the second network.

Optionally, the method further includes: The terminal device sends a second cache indication to the first interworking device, where the second cache indication is used to indicate the first interworking device to cache second downlink data received through the forwarding tunnel.

According to a second aspect, a network handover method is provided, and includes: A first interworking device sets up a first tunnel to a terminal device in a first network, where a communication identifier, of the terminal device, in the first tunnel is a first identifier, the first identifier is an identifier used in the first network by the terminal device, and the first interworking device is an interface device that is in the first network and oriented toward a network other than the first network. The first interworking device receives an update request sent by the terminal device, where the update request is used to request to update the communication identifier to a second identifier, and the second identifier is an identifier used in a second network by the terminal device. The first interworking device updates the communication identifier, of the terminal device, in the first tunnel to the second identifier based on the update request.

According to the network handover method provided in this application, the terminal device sets up a tunnel to the interworking device of the first network when the terminal device is in the first network, so that after the terminal device is handed over to the second network, the terminal device can communicate through the tunnel, provided that a local identifier used in the tunnel by the terminal device is updated. In this way, network handover duration can be reduced, and service continuity can be improved.

Optionally, the method further includes: The first interworking device sets up a first channel to a forwarding device of the first network, where the first channel belongs to a session of the terminal device. The first interworking device caches first downlink data received through the first channel. The first interworking device sends the first downlink data to the terminal device through the first tunnel after updating the communication identifier, of the terminal device, in the first tunnel to the second identifier.

Before the network handover, the channel between the interworking device and the forwarding device is set up for a session that is performing service access, so that data of a service that is being accessed by the terminal device can be cached by using the interworking device, and the data can be sent to the terminal device after the handover is completed. In this way, a data loss can be avoided, and a network handover process can be further optimized.

Optionally, the method further includes: The first interworking device receives a first cache indication, where the first cache indication is used to indicate the first interworking device to cache downlink data received through the first channel. That the first interworking device caches first downlink data received through the first channel includes: The first interworking device caches the first downlink data based on the first cache indication.

Therefore, a loss, of the first downlink data, caused by the handover of the terminal device can be avoided, and the service continuity can be further ensured.

Optionally, the method further includes. The first interworking device sets up a forwarding tunnel to an access device of the first network, where the forwarding tunnel is used to transmit downlink data of the terminal device. The first interworking device caches second downlink data received through the forwarding tunnel. The first interworking device sends the second downlink data to the terminal device through the first tunnel after updating the communication identifier, of the terminal device, in the first tunnel to the second identifier.

Before the network handover, the forwarding tunnel between the access device and the interworking device is set up for the session that is performing service access, so that the data of the service that is being accessed by the terminal device can be cached by using the interworking device, and the data can be sent to the terminal device after the handover is completed. In this way, the data loss can be avoided, and the network handover process can be further optimized.

Therefore, the loss, of the first downlink data, caused by the handover of the terminal device can be avoided, and the service continuity can be further ensured.

Optionally, the method further includes: The first interworking device receives a second cache indication, where the second cache indication is used to indicate the first interworking device to cache downlink data received through the forwarding tunnel. That the first interworking device caches second downlink data received through the forwarding tunnel includes: The first interworking device caches the second downlink data based on the second cache indication.

According to a third aspect, a network handover method is provided, and includes: An access device of a first network sets up a forwarding tunnel to a first interworking device, where the forwarding tunnel is used to transmit downlink data of a terminal device, and the first interworking device is an interface device that is in the first network and oriented toward a network other than the first network. The access device of the first network sends the downlink data of the terminal device to the first interworking device through the forwarding tunnel.

Therefore, a loss, of the first downlink data, caused by handover of the terminal device can be avoided, and service continuity can be further ensured.

Optionally, that an access device of a first network sets up a forwarding tunnel to a first interworking device, where the forwarding tunnel is used to transmit downlink data of the terminal device includes: The access device of the first network receives measurement information of the second network sent by the terminal device. The access device of the first network sends a first tunnel setup request to an access control device of the first network when the measurement information meets a preset network handover condition.

Optionally, the first tunnel setup request includes an identifier of the second network.

Optionally, the first tunnel setup request includes a network handover indication.

Optionally, that an access device of a first network sets up a forwarding tunnel to a first interworking device, where the forwarding tunnel is used to transmit downlink data of the terminal device includes: The access device of the first network receives, through a forwarding device of the first network, a tunnel identifier allocated by an access control device of the first network to the forwarding device of the first network. The tunnel identifier is allocated by the access control device of the first network based on a second tunnel setup indication sent by the first interworking device.

According to a fourth aspect, a network handover method is provided, and includes: A forwarding device of a first network sets up a first channel to a first interworking device, where the first channel belongs to a session of a terminal device, and the first interworking device is an interface device that is in the first network and oriented toward a network other than the first network. The forwarding device of the first network sends downlink data of the terminal device to the first interworking device through the first channel.

Therefore, a loss, of the first downlink data, caused by handover of the terminal device can be avoided, and service continuity can be further ensured.

Optionally, the method further includes: The forwarding device of the first network receives trigger information, where the trigger information is used to indicate the forwarding device of the first network to send the downlink data of the terminal device through the first channel. That the forwarding device of the first network sends downlink data of the terminal device to the first interworking device through the first channel includes: The forwarding device of the first network sends the downlink data of the terminal device to the first interworking device through the first channel based on the trigger information.

Optionally, the method further includes: The forwarding device of the first network receives a reservation indication, where the reservation indication is used to request to reserve a second channel, the second channel is a channel between an access device of the first network and the forwarding device of the first network, and the first channel and the second channel belong to a same session. The forwarding device of the first network reserves the second channel based on the reservation indication.

According to a fifth aspect, a network handover method is provided, and includes: Before a terminal device is handed over from a first network to a second network, the terminal device sends a first message to an access management device of the second network through a second interworking device, where the first message is used to request to register the terminal device with the second network, and the second interworking device is an interface device that is in the second network and oriented toward a network other than the second network. The terminal device receives a response message from the access management device of the second network through the second interworking device, where the response message includes a temporary identifier allocated by the access management device of the second network to the terminal device. When the terminal device is handed over from the first network to the second network, the terminal device sends a second message to the access management device of the second network, where the second message is used to request to register the terminal device with the second network, and the second message includes the temporary identifier.

According to the network handover method provided in this application, when the terminal device is in the first network, the terminal device performs a registration process for the second network by using the interworking device of the second network, so that the terminal device can be registered with the second network before the terminal device is handed over to an NPN. In this way, handover processing duration caused by registration after the network handover can be reduced.

According to a sixth aspect, a network handover method is provided, and includes: An access management device of a second network receives a first message from a terminal device in a first network through a second interworking device, where the second interworking device is an interface device that is in the second network and oriented toward a network other than the second network, and the first message is used to request to register the terminal device with the second network. The access management device of the second network determines a security parameter of the terminal device based on the first message, and allocates a temporary identifier to the terminal device. The access management device of a second network receives a second message that is sent by the terminal device through an access device of the second network, where the second message is used to request to register the terminal device with the second network, and the second message includes the temporary identifier. Based on the temporary identifier, the access device of the second network uses the security parameter to control communication, in the second network, of the terminal device.

According to the network handover method provided in this application, when the terminal device is in the first network, the terminal device performs a registration process for the second network by using the interworking device of the second network, so that the terminal device can be registered with the second network before the terminal device is handed over to an NPN. In this way, handover processing duration caused by registration after the network handover can be reduced.

According to a seventh aspect, a network handover apparatus is provided, and includes: a processing unit, configured to set up a first tunnel to a first interworking device before handover from a first network to a second network is performed, where a communication identifier, in the first tunnel, of a terminal device is a first identifier, the first identifier is an identifier used in the first network by the terminal device, and the first interworking device is an interface device that is in the first network and oriented toward a network other than the first network; and a transceiver unit, configured to: after the handover from the first network to the second network is performed, send an update request to the first interworking device, where the update request is used to request to update the communication identifier to the second identifier, and the second identifier is an identifier used in the second network by the terminal device.

According to the network handover apparatus provided in this application, the terminal device sets up a tunnel to the interworking device of the first network when the terminal device is in the first network, so that after the terminal device is handed over to the second network, the terminal device can communicate through the tunnel, provided that a local identifier used in the tunnel by the terminal device is updated. In this way, network handover duration can be reduced, and service continuity can be improved.

Optionally, the first network may be one of a public land mobile network (PLMN) or a non-public network (NPN), and the second network may be the other one of the public land mobile network (PLMN) or the non-public network (NPN).

Optionally, the first identifier includes a 5G globally unique temporary identity 5G-GUTI of the terminal device.

Alternatively, the first identifier includes an IP address obtained in the first network by the terminal device.

The "IP address obtained in the first network by the terminal device" may be understood as an IP address obtained when the terminal device sets up a session with a forwarding device of the first network by using an access network device of the first network.

Alternatively, the "IP address obtained in the first network by the terminal device" may be understood as another IP address obtained in the first network by the terminal device.

Optionally, that "the first interworking device is an interface device that is in the first network and oriented toward a network other than the first network" may be understood as: The first interworking device is a device that is in the first network and that provides a communication service for a terminal device in the network other than the first network.

Optionally, that "the second interworking device is an interface device that is in the second network and oriented toward a network other than the second network" may be understood as: The second interworking device is a device that is in the second network and that provides a communication service for a terminal device in the network other than the second network.

Optionally, the transceiver unit is further configured to: before handover from a first network to a second network is performed, send a first message to an access management device of the second network through a second interworking device, where the second interworking device is an interface device that is in the second network and oriented toward a network other than the second network; configured to receive a response message from the access management device of the second network through the second interworking device, where the response message includes a temporary identifier allocated by the access management device of the second network to the terminal device: and configured to send a second message to the access management device of the second network when the handover from the first network to the second network is performed, where the second message includes the temporary identifier.

The first message may include a device identifier of the terminal device, and the device identifier may include any one of the following identifiers: a media access control (media access control, MAC) address, a mobile phone number, an international mobile subscriber identity (international mobile subscriber identification number, IMSI), or an international mobile equipment identity (international mobile equipment identity, IMEI).

According to the network handover apparatus provided in this application, when the terminal device is in the first network, the terminal device performs a registration process for the second network by using the interworking device of the second network, so that the terminal device can be registered with the second network before the terminal device is handed over to an NPN. In this way, handover processing duration caused by registration after the network handover can be reduced.

Optionally, the transceiver unit is further configured to send a third registration request to the access management device of the first network through the first interworking device before the handover from the first network to the second network is performed.

Optionally, the third registration request includes pre-handover indication information, and the pre-handover indication information is used to indicate that the terminal device needs to be handed over to the second network.

Therefore, the access management device of the first network may determine, based on the pre-handover indication information, that the terminal device has not completed the network handover, or in other words, determine that the terminal device is still located in the first network, so that a policy and control that are related to a terminal location may not be changed. For example, a location-related policy update may not be performed, and location-related service control may not be changed.

Optionally, the processing unit is further configured to indicate, before the handover from the first network to the second network is performed, the first interworking device to set up a first channel to the forwarding device of the first network, where the first channel belongs to a session of the terminal device. The transceiver unit is further configured to send a first cache indication to the first interworking device, where the first cache indication is used to indicate the first interworking device to cache received first downlink data of the first channel.

Therefore, a loss, of the first downlink data, caused by the handover of the terminal device can be avoided, and service continuity can be further ensured.

Optionally, the transceiver unit is further configured to send trigger information to the forwarding device of the first network, where the trigger information is used to indicate the forwarding device of the first network to send downlink data of the terminal device through the first channel.

In this way, the service continuity can be further ensured.

Optionally, the transceiver unit is further configured to send a reservation indication, where the reservation indication is used to request to reserve a second channel, the second channel is a channel between an access device of the first network and the forwarding device of the first network, and the first channel and the second channel belong to a same session.

In this way, the service continuity can be further ensured.

Optionally, the transceiver unit is further configured to: before the handover from the first network to the second network is performed, send a forwarding tunnel setup request, where the forwarding tunnel setup request is used to request to set up, between the access device of the first network and the first interworking device, a forwarding tunnel for transmitting the downlink data of the terminal device.

Therefore, the loss, of the first downlink data, caused by the handover of the terminal device can be avoided, and the service continuity can be further ensured.

Optionally, the tunnel setup request includes a measurement report of the second network.

Optionally, the transceiver unit is further configured to send a second cache indication to the first interworking device, where the second cache indication is used to indicate the first interworking device to cache second downlink data received through the forwarding tunnel.

The units in the apparatus are respectively configured to perform the steps of the method in the first aspect and the implementations of the first aspect.

In a design, the apparatus is a communications chip. The communications chip may include an input circuit or interface configured to send information or data, and an output circuit or interface configured to receive information or data.

In another design, the apparatus is a terminal device. The device may include a transmitter configured to send information or data, and a receiver configured to receive information or data.

According to an eighth aspect, a network handover apparatus is provided, and includes: a processing unit, configured to set up a first tunnel to a terminal device in a first network, where a communication identifier, of the terminal device, in the first tunnel is a first identifier, the first identifier is an identifier used in the first network by the terminal device, and the apparatus is an interface device that is in the first network and oriented toward a network other than the first network, and a transceiver unit, configured to receive an update request sent by the terminal device, where the update request is used to request to update the communication identifier to a second identifier, and the second identifier is an identifier used in a second network by the terminal device, where the processing unit is further configured to update the communication identifier, of the terminal device, in the first tunnel to the second identifier based on the update request.

According to the network handover apparatus provided in this application, the terminal device sets up a tunnel to an interworking device of the first network when the terminal device is in the first network, so that after the terminal device is handed over to the second network, the terminal device can communicate through the tunnel, provided that a local identifier used in the tunnel by the terminal device is updated. In this way, network handover duration can be reduced, and service continuity can be improved.

Optionally, the processing unit is further configured to set up a first channel to a forwarding device of the first network, where the first channel belongs to a session of the terminal device. The transceiver unit is further configured to receive a first cache indication sent by the terminal device, where the first cache indication is used to indicate the first interworking device to cache first downlink data received through the first channel. The processing unit is further configured to cache the first downlink data based on the first cache indication. The transceiver unit is further configured to send the first downlink data to the terminal device through the first tunnel after the communication identifier, of the terminal device, in the first tunnel is updated to the second identifier.

Therefore, a loss, of the first downlink data, caused by the handover of the terminal device can be avoided, and the service continuity can be further ensured.

Optionally, the processing unit is further configured to: set up a forwarding tunnel to an access device of the first network, and cache second downlink data received through the forwarding tunnel, where the forwarding tunnel is used to transmit downlink data of the terminal device. The transceiver unit is further configured to send the second downlink data to the terminal device through the first tunnel after the communication identifier, of the terminal device, in the first tunnel is updated to the second identifier.

Therefore, the loss, of the first downlink data, caused by the handover of the terminal device can be avoided, and the service continuity can be further ensured.

Optionally, the transceiver unit is further configured to receive a second cache indication, where the second cache indication is used to indicate the first interworking device to cache downlink data received through the forwarding tunnel. The processing unit is specifically configured to cache the second downlink data based on the second cache indication.

The units in the apparatus are respectively configured to perform the steps of the method in the second aspect and the implementations of the second aspect.

In a design, the apparatus is a communications chip. The communications chip may include an input circuit or interface configured to send information or data, and an output circuit or interface configured to receive information or data.

In another design, the apparatus is an interworking device. The device may include a transmitter configured to send information or data, and a receiver configured to receive information or data.

According to a ninth aspect, a network handover apparatus is provided, and includes: a processing unit, configured to sets up a forwarding tunnel to a first interworking device, where the forwarding tunnel is used to transmit downlink data of the terminal device, and the first interworking device is an interface device that is in the first network and oriented toward a network other than the first network: and a transceiver unit, configured to send the downlink data of the terminal device to the first interworking device through the forwarding tunnel.

Therefore, a loss, of the first downlink data, caused by handover of the terminal device can be avoided, and service continuity can be further ensured.

The units in the apparatus are respectively configured to perform the steps of the method in the third aspect and the implementations of the third aspect.

In a design, the apparatus is a communications chip. The communications chip may include an input circuit or interface configured to send information or data, and an output circuit or interface configured to receive information or data.

In another design, the apparatus is a forwarding device. The device may include a transmitter configured to send information or data, and a receiver configured to receive information or data.

According to a tenth aspect, a network handover apparatus is provided, and includes: a processing unit, configured to set up a first channel to a first interworking device, where the first channel belongs to a session of a terminal device, and the first interworking device is an interface device that is in the first network and oriented toward a network other than the first network; and a transceiver unit, configured to send downlink data of the terminal device to the first interworking device through the first channel.

Therefore, a loss, of first downlink data, caused by handover of the terminal device can be avoided, and service continuity can be further ensured.

Optionally, the transceiver unit is further configured to receive trigger information, where the trigger information is used to indicate a forwarding device of the first network to send the downlink data of the terminal device through the first channel, and send the downlink data of the terminal device to the first interworking device through the first channel based on the trigger information.

Optionally, the transceiver unit is further configured to receive a reservation indication, where the reservation indication is used to request to reserve a second channel, the second channel is a channel between an access device of the first network and the forwarding device of the first network, and the first channel and the second channel belong to a same session. The processing unit is further configured to reserve the second channel based on the reservation indication.

The units in the apparatus are respectively configured to perform the steps of the method in the fourth aspect and the implementations of the fourth aspect.

In a design, the apparatus is a communications chip. The communications chip may include an input circuit or interface configured to send information or data, and an output circuit or interface configured to receive information or data.

In another design, the apparatus is a forwarding device. The device may include a transmitter configured to send information or data, and a receiver configured to receive information or data.

According to an eleventh aspect, a network handover apparatus is provided, and includes: a transceiver unit, configured to: before handover from a first network to a second network is performed, send the first message to an access management device of the second network through a second interworking device, where the second interworking device is an interface device that is in the second network and oriented toward a network other than the second network; configured to receive a response message from the access management device of the second network through the second interworking device, where the response message includes a temporary identifier allocated by the access management device of the second network to a terminal device; and configured to send a second message to the access management device of the second network when the handover from the first network to the second network is performed, where the second message includes the temporary identifier.

According to the network handover apparatus provided in this application, when the terminal device is in the first network, the terminal device performs a registration process for the second network by using the interworking device of the second network, so that the terminal device can be registered with the second network before the terminal device is handed over to an NPN. In this way, handover processing duration caused by registration after the network handover can be reduced.

The units in the apparatus are respectively configured to perform the steps of the method in the fifth aspect and the implementations of the fifth aspect.

In a design, the apparatus is a communications chip. The communications chip may include an input circuit or interface configured to send information or data, and an output circuit or interface configured to receive information or data.

In another design, the apparatus is a terminal device. The device may include a transmitter configured to send information or data, and a receiver configured to receive information or data.

According to a twelfth aspect, a network handover apparatus is provided, and includes: a transceiver unit, configured to receive a first message from a terminal device in a first network through a second interworking device, where the second interworking device is an interface device that is in a second network and oriented toward a network other than the second network: and a processing unit, configured to: determine a security parameter of the terminal device based on the first message, and allocate a temporary identifier to the terminal device. The transceiver unit is further configured to receive a second message sent by the terminal device through an access device of the second network, where the second message includes the temporary identifier. The processing unit is further configured to: based on the temporary identifier, use the security parameter to control communication, in the second network, of the terminal device.

According to the network handover apparatus provided in this application, when the terminal device is in the first network, the terminal device performs a registration process for the second network by using the interworking device of the second network, so that the terminal device can be registered with the second network before the terminal device is handed over to an NPN. In this way, handover processing duration caused by registration after the network handover can be reduced.

The units in the apparatus are respectively configured to perform the steps of the method in the sixth aspect and the implementations of the sixth aspect.

In a design, the apparatus is a communications chip. The communications chip may include an input circuit or interface configured to send information or data, and an output circuit or interface configured to receive information or data.

In another design, the apparatus is an access management device. The device may include a transmitter configured to send information or data, and a receiver configured to receive information or data.

According to a thirteenth aspect, a terminal device is provided, and includes a processor and a memory. The memory is configured to store a computer program. The processor is configured to invoke the computer program from the memory and run the computer program, to enable the communications device to perform the method in the first aspect and the various implementations of the first aspect.

Optionally, there are one or more processors and one or more memories.

Optionally, the memory may be integrated with the processor, or the memory and the processor are separately disposed.

Optionally, the terminal device further includes a transmitting machine (transmitter) and a receiving machine (receiver).

According to a fourteenth aspect, an interworking device is provided, and includes a processor and a memory. The memory is configured to store a computer program. The processor is configured to invoke the computer program from the memory and run the computer program, to enable the communications device to perform the communication method in the second aspect and the various implementations of the second aspect.

Optionally, there are one or more processors and one or more memories.

Optionally, the memory may be integrated with the processor, or the memory and the processor are separately disposed.

Optionally, the interworking device further includes a transmitting machine (transmitter) and a receiving machine (receiver).

According to a fifteenth aspect, an access device is provided, and includes a processor and a memory. The memory is configured to store a computer program. The processor is configured to invoke the computer program from the memory and run the computer program, to enable the communications device to perform the communication method in the third aspect and the various implementations of the third aspect.

Optionally, there are one or more processors and one or more memories.

Optionally, the memory may be integrated with the processor, or the memory and the processor are separately disposed.

Optionally, the access device further includes a transmitting machine (transmitter) and a receiving machine (receiver).

According to a sixteenth aspect, a forwarding device is provided, and includes a processor and a memory. The memory is configured to store a computer program. The processor is configured to invoke the computer program from the memory and run the computer program, to enable the communications device to perform the communication method in the fourth aspect and the various implementations of the fourth aspect.

Optionally, there are one or more processors and one or more memories.

Optionally, the memory may be integrated with the processor, or the memory and the processor are separately disposed.

Optionally, the forwarding device further includes a transmitting machine (transmitter) and a receiving machine (receiver).

According to a seventeenth aspect, a terminal device is provided, and includes a processor and a memory. The memory is configured to store a computer program. The processor is configured to invoke the computer program from the memory and run the computer program, to enable the communications device to perform the communication method in the fifth aspect and the various implementations of the fifth aspect.

Optionally, there are one or more processors and one or more memories.

Optionally, the memory may be integrated with the processor, or the memory and the processor are separately disposed.

Optionally, the terminal device further includes a transmitting machine (transmitter) and a receiving machine (receiver).

According to an eighteenth aspect, an access management device is provided, and includes a processor and a memory. The memory is configured to store a computer program. The processor is configured to invoke the computer program from the memory and run the computer program, to enable the communications device to perform the communication method in the sixth aspect and the various implementations of the sixth aspect.

Optionally, there are one or more processors and one or more memories.

Optionally, the memory may be integrated with the processor, or the memory and the processor are separately disposed.

Optionally, the access management device further includes a transmitting machine (transmitter) and a receiving machine (receiver).

According to a nineteenth aspect, a communications system is provided, and includes at least one device of the foregoing terminal device, interworking device, access management device, access device, and forwarding device.

In a possible design, the communications system may further include another device that interacts with any one of the foregoing devices in the solutions provided in the embodiments of this application.

According to a twentieth aspect, a computer program product is provided. The computer program product includes a computer program (which may also be referred to as code or instructions). When the computer program is run, a computer is enabled to perform the method according to any one of the first aspect to the sixth aspect and the possible implementations thereof.

According to a twenty-first aspect, a computer-readable medium is provided. The computer-readable medium stores a computer program (which may also be referred to as code or instructions). When the computer program is run on a computer, the computer is enabled to perform the method according to any one of the first aspect to the sixth aspect and the possible implementations thereof.

According to a twenty-second aspect, a chip system is provided, and includes a memory and a processor. The memory is configured to store a computer program, and the processor is configured to invoke the computer program from the memory and run the computer program, so that a communications device on which the chip system is installed performs the method according to any one of the first aspect to the sixth aspect and the possible implementations thereof.

The chip system may include an input circuit or interface configured to send information or data, and an output circuit or interface configured to receive information or data.

According to the network handover method provided in this application, the terminal device sets up the tunnel to the interworking device of the first network when the terminal device is in the first network, so that after the terminal device is handed over to the second network, the terminal device can communicate through the tunnel, provided that the local identifier used in the tunnel by the terminal device is updated. Alternatively, when the terminal device is in the first network, a process of registering the terminal device with the second network is performed by using the interworking device of the second network, so that the terminal device can be registered with the second network before the terminal device is handed over to the NPN. In this way, the handover processing duration caused by the registration after the network handover can be reduced, so that the network handover duration can be reduced, and the service continuity can be improved.

DESCRIPTION OF EMBODIMENTS

Figure 1:
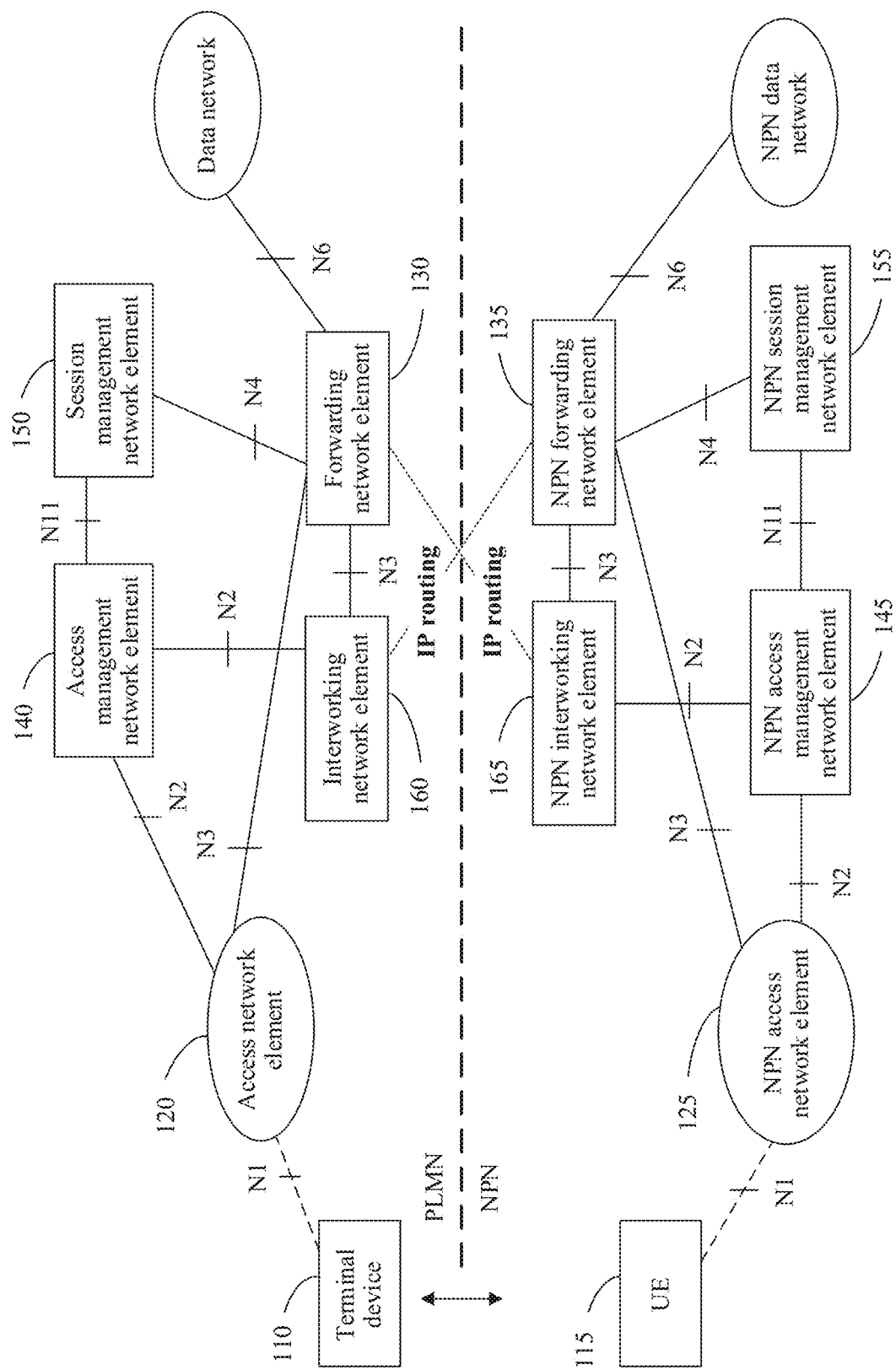
FIG. 1 is a schematic structural diagram of an example of a communications system according to this application.

The following describes technical solutions of this application with reference to the accompanying drawings.

Terminologies such as "component", "module", and "system" used in this application are used to indicate computer-related entities, hardware, firmware, combinations of hardware and software, software, or software being executed. For example, a component may be, but is not limited to, a process that runs on a processor, a processor, an object, an executable file, a thread of execution, a program, and/or a computer. As shown in figures, both a computing device and an application that runs on a computing device may be components. One or more components may reside within a process and/or a thread of execution, and a component may be located on one computer and/or distributed between two or more computers. In addition, these components may be executed from various computer-readable media that store various data structures. For example, the components may communicate by using a local and/or remote process and according to, for example, a signal having one or more data packets (for example, data from two components interacting with another component in a local system, a distributed system, and/or across a network such as the internet interacting with other systems by using the signal).

The technical solutions of the embodiments of this application may be used in various communications systems, such as: a global system for mobile communications (Global System for Mobile communications, GSM), a code division multiple access (Code Division Multiple Access, CDMA) system, a wideband code division multiple access (Wideband Code Division Multiple Access, WCDMA) system, a general packet radio service (General Packet Radio Service, GPRS) system, a long term evolution (Long Term Evolution, LTE) system, an LTE frequency division duplex (Frequency Division Duplex, FDD) system, an LTE time division duplex (Time Division Duplex, TDD) system, a universal mobile telecommunications system (Universal Mobile Telecommunications System, UMTS), a worldwide interoperability for microwave access (Worldwide Interoperability for Microwave Access, WiMAX) communications system, and a future 5th generation (5th Generation, 5G) system or new radio (New Radio, NR) system.

Usually, a conventional communications system supports a limited quantity of connections and is easy to implement. However, with development of communications technologies, a mobile communications system not only supports conventional communication, but also supports, for example, device to device (Device to Device, D2D) communication, machine to machine (Machine to Machine, M2M) communication, machine type communication (Machine Type Communication, MTC), and vehicle to everything (Vehicle To Everything, V2X) communication, for example, vehicle to vehicle (Vehicle to Vehicle, V2V) communication, vehicle to infrastructure (Vehicle to Infrastructure, V2I) communication, vehicle to pedestrian (Vehicle to Pedestrian, V2P) communication, and vehicle to network (Vehicle to Network, V2N) communication.

FIG. 1 shows a network architecture used in an embodiment of this application. Network elements that may be in the network architecture are separately described.

A communications system in this application may include at least two types of networks, for example, a public land mobile network (public land mobile network, PLMN) and a non-public network (non-public network, NPN).

The PLMN may include the following network elements.

1. A terminal device 110 may include various handheld devices, vehicle-mounted devices, wearable devices, and computing devices that have a wireless communication function, or other processing devices connected to a wireless modem, and terminals in various forms, such as a mobile station (mobile station, MS), a terminal (terminal), user equipment (user equipment, UE), and a soft client. For example, the terminal device 110 may be a water meter, an electricity meter, or a sensor.

2. A (radio) access network (radio access network, (R)AN) network element 120 is configured to provide a network access function for authorized terminal devices in a specific area, and can use transmission tunnels with different quality based on levels of the terminal devices, service requirements, and the like.

The (R)AN network element can manage radio resources and provide an access service for a terminal device, to forward a control signal and terminal device data between the terminal device and a core network. The (R)AN network element may also be understood as a base station in a conventional network.

It should be noted that the "network element" may also be referred to as an entity, a device, an apparatus, a module, or the like. This is not particularly limited in this application. In addition, in this application, for ease of understanding and description, the description of the "network element" is omitted in some descriptions. For example, a (R)AN network element is briefly referred to as a (R)AN. In this case, the "(R)AN" should be understood as a (R)AN network element or a (R)AN entity. Same or similar cases are not described below.

3. A forwarding network element 130 is used for packet routing and forwarding, quality of service (quality of service, QoS) processing of user plane data, and the like.

In a 5G communications system, the user plane network element may be a user plane function (user plane function. UPF) network element. In a future communications system, the user plane network element may still be a UPF network element, or may have another name. This is not limited in this application.

4. A data network element is configured to provide a network for data transmission.

In the 5G communications system, the data network element may still be a data network (data network, DN) element. In a future communications system, the data network element may still be a DN network element, or may have another name. This is not limited in this application.

5. An access management network element 140 is mainly configured to perform mobility management, access management, and the like, and may be configured to implement functions, for example, lawful interception and access authorization/authentication, other than session management in functions of a mobility management entity (mobility management entity, MME).

In a 5G communications system, the access management network element may be an access and mobility management function (access and mobility management function, AMF) network element. In a future communications system, the access management network element may still be an AMF network element, or may have another name. This is not limited in this application.

6. A session management network element 150 is mainly configured to: manage a session, assign and manage an internet protocol (internet protocol, IP) address of a terminal device, select an endpoint that can manage a user plane function interface and a policy control and charging function interface, notify downlink data, and so on.

In the 5G communications system, the session management network element may be a session management function (session management function, SMF) network element. In a future communications system, the session management network element may still be an SMF network element, or may have another name. This is not limited in this application.

7. A policy control network element is configured to: provide guidance on a unified policy framework for network behavior, provide policy rule information for a control plane function network element (such as an AMF or an SMF network element), and so on.

In a 4G communications system, the policy control network element may be a policy and charging rules function (policy and charging rules function, PCRF) network element. In the 5G communications system, the policy control network element may be a policy control function (policy control function. PCF) network element. In a future communications system, the policy control network element may still be a PCF network element, or may have another name. This is not limited in this application.

8. A binding support network element is configured to search for a PCF associated with a session.

In the 5G communications system, the binding support network element may be a binding support function (binding support function, BSF) network element. In a future communications system, the binding support network element may still be a BSF network element, or may have another name. This is not limited in this application.

9. An authentication server is configured to: authenticate a service, generate a key to implement bidirectional authentication for a terminal device, and support a unified authentication framework.

In the 5G communications system, the authentication server may be an authentication server function (authentication server function, AUSF) network element. In a future communications system, the authentication server function network element may still be an AUSF network element, or may have another name. This is not limited in this application.

10. A data management network element is configured to: process a terminal device identifier, and perform access authentication, registration, and mobility management, and the like.

In the 5G communications system, the data management network element may be a unified data management (unified data management, UDM) network element. In a future communications system, the unified data management may still be a UDM network element, or may have another name. This is not limited in this application.

11. An application network element is configured to: perform application-affected data routing, access a network exposure function network element, interact with a policy framework to perform policy control, and so on.

In the 5G communications system, the application network element may be an application function (application function, AF) network element. In a future communications system, the application network element may still be an AF network element, or may have another name. This is not limited in this application.

12. A network storage network element is configured to maintain real-time information of all network function services in a network.

In the 5G communications system, the network storage network element may be a network repository function (network repository function, NRF) network element. In a future communications system, the network storage network element may still be an NRF network element, or may have another name. This is not limited in this application.

13. An interworking network element 160 is configured to be responsible for a terminal device in a network outside a PLMN to access a service through the PLMN. In other words, the interworking network element may be an interface network element that is in the PLMN and oriented toward another network.

In the 5G communications system, the interworking network element may alternatively be a non-3GPP interworking function (Non-3GPP interworking function, N3IWF) network element.

The NPN may include the following network elements.

14. A terminal device 115 may include various handheld devices, vehicle-mounted devices, wearable devices, and computing devices that have a wireless communication function, or other processing devices connected to a wireless modem, and terminals in various forms, such as a mobile station (mobile station, MS), a terminal (terminal), user equipment (user equipment, UE), and a soft client. For example, the terminal device 115 may be a water meter, an electricity meter, or a sensor.

15. An NPN (radio) access network (NPN radio access network, NPN-(R)AN) network element 125 is configured to provide a network access function for authorized terminal devices in a specific area, and can use transmission tunnels with different quality based on levels of the terminal devices, service requirements, and the like.

The NPN-(R)AN network element can manage radio resources and provide an access service for a terminal device, to forward a control signal and terminal device data between the terminal device and a core network that is of the NPN. The NPN-(R)AN network element may also be understood as a base station or an access point in the NPN.

16. A forwarding network element 135 is used for packet routing and forwarding, quality of service (quality of service, QoS) processing of user plane data, and the like.

In the NPN, the user plane network element may be an NPN user plane function (NPN user plane function. NPN-PF) network element. In a future communications system, the user plane network element may still be a UPF network element, or may have another name. This is not limited in this application.

17. An NPN data network element is configured to provide a network for data transmission.

In the NPN, the data network element may be an NPN data network (NPN data network, NPN-DN) network element. In a future communications system, the data network element may still be a DN network element, or may have another name. This is not limited in this application.

18. An NPN access management network element 145 is mainly configured to perform mobility management, access management, and the like, and may be configured to implement functions, for example, lawful interception and access authorization/authentication, other than session management in functions of an NPN mobility management entity (NPN mobility management entity, NPN-MME).

In the NPN, the access management network element may be an NPN access and mobility management function (NPN access and mobility management function, NPN-AMF) network element. In a future communications system, the access management network element may still be an AMF network element, or may have another name. This is not limited in this application.

19. An NPN session management network element 155 is mainly configured to: manage a session, assign and manage an internet protocol (internet protocol, IP) address of a terminal device, select an endpoint that can manage a user plane function interface and a policy control and charging function interface, notify downlink data, and so on.

In the NPN, the session management network element may be an NPN session management function (NPN session management function, NPN-SMF) network element. In a future communications system, the session management network element may still be an SMF network element, or may have another name. This is not limited in this application.

20. An NPN policy control network element is configured to: provide guidance on a unified policy framework for network behavior, provide policy rule information for a control plane function network element (such as the NPN-AMF or the NPN-SMF network element), and so on.

In the NPN, the policy control network element may be an NPN policy and charging rules function (NPN policy and charging rules function, NPN-PCRF) network element. Alternatively, the policy control network element may be an NPN policy control function (NPN policy control function, NPN-PCF) network element. In a future communications system, the policy control network element may still be a PCF network element, or may have another name. This is not limited in this application.

21. An NPN binding support network element is configured to search for a PCF associated with a session.

In the NPN, the binding support network element may be an NPN binding support function (NPN binding support function, NPN-BSF) network element. In a future communications system, the binding support network element may still be a BSF network element, or may have another name. This is not limited in this application.

22. An NPN authentication server is configured to: authenticate a service, generate a key to implement bidirectional authentication for a terminal device, and support a unified authentication framework.

In the NPN, the authentication server may be an NPN authentication server function (NPN authentication server function, NPN-AUSF) network element. In a future communications system, the authentication server function network element may still be an AUSF network element, or may have another name. This is not limited in this application.

23. An NPN data management network element is configured to: process a terminal device identifier, and perform access authentication, registration, and mobility management, and the like.

In the NPN, the data management network element may be an NPN unified data management (NPN unified data management, NPN-DM) network element. In a future communications system, the unified data management may still be a UDM network element, or may have another name. This is not limited in this application.

24. An NPN application network element is configured to: perform application-affected data routing, access a network exposure function network element, interact with a policy framework to perform policy control, and so on.

In the NPN, the application network element may be an NPN application function (NPN application function, NPN-AF) network element. In a future communications system, the application network element may still be an AF network element, or may have another name. This is not limited in this application.

25. An NPN network storage network element is configured to maintain real-time information of all network function services in a network.

In the NPN, the network storage network element may be an NPN network repository function (NPN network repository function, NPN-NRF) network element. In a future communications system, the network storage network element may still be an NRF network element, or may have another name. This is not limited in this application.

26. An NPN interworking network element 165 is configured to be responsible for a terminal device in a network outside the NPN to access a service through the NPN. In other words, the interworking network element may be an interface network element that is in the NPN and oriented toward another network.

In the NPN, the interworking network element may alternatively be an NPN non-3GPP interworking function (NPN Non-3GPP interworking function, NPN-N3IWF) network element.

A communication link, for example, a communication tunnel or an IP routing link, exists between the forwarding network element 130 and the NPN interworking network element 165, and a communication link, for example, a communication tunnel or an IP routing link, exists between the NPN forwarding network element 135 and the interworking network element 160.

In other words, in the communications system 100, the terminal device 110 may access a service through the PLMN by using the RAN 120 and the forwarding network element 130.

In addition, the terminal device 110 may access a service through the NPN by using the RAN 120, the forwarding network element 130, the NPN interworking network element 165, and the NPN forwarding network element 135.

In addition, in the communications system 100, the terminal device 115 may access a service through the NPN by using the NPN RAN 125 and the NPN forwarding network element 135.

In addition, the terminal device 115 may access a service through the PLMN by using the NPN RAN 125, the NPN forwarding network element 135, the interworking network element 160, and the forwarding network element 130.

It should be noted that the "network element" may also be referred to as an entity, a device, an apparatus, a module, or the like. This is not particularly limited in this application. In addition, in this application, for ease of understanding and description, the description of the "network element" is omitted in some descriptions. For example, an AMF network element is briefly referred to as an AMF. In this case, the "AMF" should be understood as an AMF network element or an AMF entity. Same or similar cases are not described below.

It may be understood that the foregoing network element or function may be a network element in a hardware device, a software function running on dedicated hardware, or a virtualized function instantiated on a platform (for example, a cloud platform).

It should be understood that the foregoing network architecture applied to this embodiment of this application is merely an example of a network architecture described from a perspective of a service architecture, and a network architecture applicable to this embodiment of this application is not limited thereto. Any network architecture that can implement functions of the foregoing network elements is applicable to this embodiment of this application.

For example, in some network architectures, network function entities such as an AMF, an SMF, a PCF, and a UDM are all referred to as network function (Network Function, NF) network elements. Alternatively, in some other network architectures, a set of network elements such as an AMF, an SMF, a PC, a GMF, and a UDM may be referred to as a control plane function (Control Plane Function, CPF) network element.

This embodiment of this application describes the embodiments with reference to a terminal device. The terminal device may also be referred to as user equipment (User Equipment, UE), an access terminal, a subscriber unit, a subscriber station, a mobile station, a mobile console, a remote station, a remote terminal, a mobile device, a user terminal, a terminal, a wireless communications device, a user agent, or user device. The terminal device may be a station (STATION, ST) in a WLAN, and may be a cellular phone, a cordless phone, a session initiation protocol (Session Initiation Protocol, SIP) phone, a wireless local loop (Wireless Local Loop, WLL) station, a personal digital assistant (Personal Digital Assistant, PDA) device, a handheld device with a wireless communication function, a computing device, another processing device connected to a wireless modem, a vehicle-mounted device, an internet of vehicles terminal, a computer, a laptop computer, a handheld communications device, a handheld computing device, a satellite wireless device, a wireless modem card, a television set top box (set top box, STB), customer premises equipment (customer premise equipment, CPE), another device configured to perform communication in a wireless system, or a next generation communications system, for example, a terminal device in a 5G network, or a terminal device in a future evolved PLMN.

By way of example and not limitation, in the embodiments of this application, the terminal device may alternatively be a wearable device. The wearable device may also be referred to as a wearable intelligent device, and is a general term for wearable device such as glasses, gloves, watches, clothes, and shoes that are developed by applying wearable technologies to intelligent designs of daily wear. The wearable device is a portable device that can be directly worn on a body or integrated into clothes or an accessory of a user. The wearable device is not only a hardware device, but is used to implement powerful functions through software support, data exchange, and cloud interaction. Generalized wearable intelligent devices include full-featured and large-size devices that can implement complete or partial functions without depending on smartphones, for example, smart watches or smart glasses, and devices that focus on only one type of application function and need to work with another device such as a smartphone, for example, various smart bands or smart accessories for monitoring physical signs.

In addition, in this embodiment of this application, the terminal device may alternatively be a terminal device in an internet of things (Internet of Things, IoT) system. The IoT is an important part of future development of information technologies, and a main technical feature of the IoT is to connect a thing to a network by using a communications technology, thereby implementing an intelligent network for interconnection between a person and a machine or between one thing and another.

In this application, each access network device may include one or more antennas. In addition, the access network device may additionally include a transmitter chain and a receiver chain. A person of ordinary skill in the art can understand that the transmitter chain and the receiver chain each may include a plurality of components (for example, a processor, a modulator, a multiplexer, a demodulator, a demultiplexer, or an antenna) related to signal sending and receiving.

Each access network device may communicate with a plurality of terminal devices.

The terminal device may be, for example, a cellular phone, a smartphone, a portable computer, a handheld communications device, a handheld computing device, a satellite radio apparatus, a global positioning system, a PDA, and/or any other appropriate device configured to perform communication in a wireless communications system.

The access network device may send data or information to the terminal device over a forward link (also referred to as a downlink), and receive data or information from the terminal device over a reverse link (also referred to as an uplink).

For example, in a frequency division duplex (Frequency Division Duplex, FDD) system, for example, the forward link and the reverse link may have different frequency bands.

For another example, in a time division duplex (Time Division Duplex, TDD) system and a full duplex (Full Duplex) system, the forward link and the reverse link may have a same frequency band.

Each antenna (or antenna group including a plurality of antennas) and/or each area designed for communication are/is referred to as a sector of the access network device.

For example, the antenna group may be designed to communicate with a terminal device in a sector within coverage of the access network device. The access network device may send signals to all terminal devices in a corresponding sector through a single antenna or a multi-antenna transmit diversity.

In a process in which the access network device communicates with the terminal device over the forward link, a transmit antenna of the access network device may improve a signal-to-noise ratio of the forward link through beamforming.

In addition, interference to a mobile device in an adjacent cell when the access network device sends signals through beamforming to the terminal devices that are randomly scattered in the related coverage is less than that in a manner in which the access network device sends, through a single antenna or a multi-antenna transmit diversity, signals to all terminal devices served by the access network device.

In a given time, the network device or the terminal device may be a wireless communications sending apparatus and/or a wireless communications receiving apparatus. When sending data, the wireless communications sending apparatus may encode data for transmission. Specifically, the wireless communications sending apparatus may obtain (for example, generate, receive from another communications apparatus, or store in a memory) a specific quantity of data bits to be sent on a channel to the wireless communications receiving apparatus. The data bits may be included in a transport block (or a plurality of transport blocks) of the data, and the transport block may be segmented to generate a plurality of code blocks.

In addition, the communications system 100 may further include a D2D network, an M2M network, an IoT network, a V2X network, or another network. FIG. 1 is only a simplified schematic diagram of an example, and the network may further include another access network device, or a network element in another mobile network, which is not shown in FIG. 1.

In this embodiment of this application, the terminal device or the forwarding device includes a hardware layer, an operating system layer running on the hardware layer, and an application layer running on the operating system layer. The hardware layer includes hardware such as a central processing unit (Central Processing Unit, CPU), a memory management unit (Memory Management Unit, MMU), and a memory (also referred to as a main memory). The operating system may be any one or more of computer operating systems implementing service processing by using a process (process), for example, a Linux operating system, a Unix operating system, an Android operating system, an iOS operating system, or a Windows operating system. The application layer includes applications such as a browser, an address book, word processing software, and instant communications software. In addition, a specific structure of an execution body of a method provided in the embodiments of this application is not specifically limited in the embodiments of this application, provided that a program that records code for the method provided in the embodiments of this application can be run to perform communication according to the method provided in the embodiments of this application. For example, the method provided in the embodiments of this application may be performed by a terminal device, a network device, or a functional module that is in a terminal device or a network device and that can invoke and execute the program.

In addition, aspects or features in the embodiments of this application may be implemented as a method, an apparatus, or a product that uses standard programming and/or engineering technologies. The term "product" used in this application covers a computer program that can be accessed from any computer-readable component, carrier, or medium. For example, the computer-readable medium may include but is not limited to: a magnetic storage component (for example, a hard disk, a floppy disk, or a magnetic tape), an optical disc (for example, a compact disc (Compact Disc, CD) or a digital versatile disc (Digital Versatile Disc, DVD)), a smart card, and a flash memory component (for example, an erasable programmable read-only memory (Erasable Programmable Read-Only Memory, EPROM), a card, a stick, or a key drive). In addition, various storage media described in this specification may represent one or more devices and/or other machine-readable media that are configured to store information. The term "machine-readable medium" may include but is not limited to a radio channel, and various other media that can store, contain, and/or carry instructions and/or data.

It should be noted that in the embodiments of this application, a plurality of application programs may be run at the application layer. In this case, an application program for performing the method in the embodiments of this application and an application program configured to control a receive end device to implement an action corresponding to received data may be different application programs.

The solutions provided in this application are applicable to a process in which a terminal device is handed over between two networks. For example, the solutions provided in this application are applicable to handover of the UE from the PLMN to the non-public network (non-public network, NPN), or the solutions provided in this application are applicable to handover of the UE from the NPN to the PLMN.

In the following, with reference to FIG. 2A and FIG. 2B and FIG. 3A and FIG. 3B, a network handover method provided in this application is described by using, as an example, a process in which UE (namely, an example of a terminal device) is handed over from a PLMN (namely, an example of a first network) to an NPN (namely, an example of a second network).

That is, in processing processes shown in FIG. 2A and FIG. 2B and FIG. 3A and FIG. 3B, the UE may perform service access in the PLMN.

Specifically, the UE may access a radio access network (radio access network, RAN) of the PLMN, which is denoted as a RAN #1.

In other words, the UE may access an access network device of the RAN #1, for example, a base station.

In addition, the UE may register with the PLMN by using the RAN #1.

The foregoing process may be similar to that of a current technology, and to avoid repetition, detailed descriptions thereof are omitted herein.

In this application, the UE may access at least one of the following services by using the RAN #1.

A: PLMN service. The PLMN service may be a service transmitted through a forwarding device (for example, a UPF, denoted as a UPF #1) of the PLMN.

Specifically, in an uplink transmission process of the PLMN service, the UE sends uplink PLMN service data to the UPF #1 through the RAN #1, and the UPF #1 may send the data to an internet side device (for example, a PLMN service server, or a receive end device of the uplink PLMN service data). In a downlink transmission process of the PLMN service, the UPF #1 sends, to the RAN #1, downlink PLMN service data that is from an external device, and the RAN #1 may send the data to the UE.

B: NPN service. The NPN service may be a service transmitted through a forwarding device (for example, a UPF, denoted as a UPF #2) of the NPN.

Specifically, in an uplink transmission process of the NPN service, UE #1 sends uplink NPN service data to a forwarding device (for example, a UPF) of the PLMN through the RAN #1, the UPF of the PLMN may send the uplink NPN service data to an interworking device (for example, an NPN-N3IWF) of the NPN, the NPN-N3IWF may send the data to a forwarding device (for example, an NPN-UPF) of the NPN, and the NPN-UPF may send the data to an external device (for example, an NPN service server, or a receive end device of the uplink NPN service data). In a downlink transmission process of the NPN service, the NPN-UPF sends, to the NPN-N3IWF, downlink NPN service data that is from an external device, the NPN-N3IWF may send the data to the UPF, the UPF may send the data to the RAN #1, and the RAN #1 may send the data to the UE.

Figure 2A:
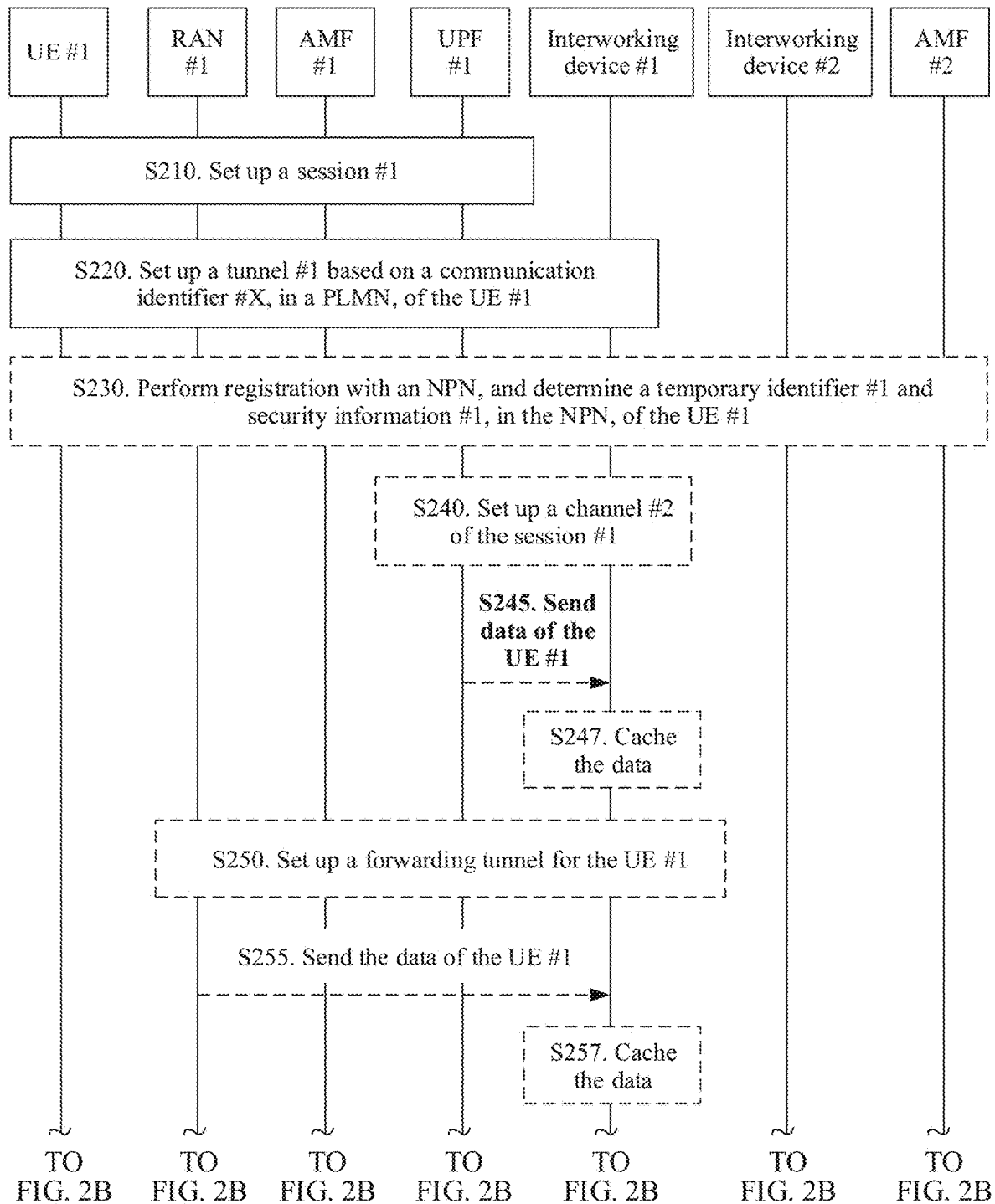
FIG. 2A and FIG. 2B are a schematic interaction diagram of an example of a network handover method according to this application.
Figure 2B:
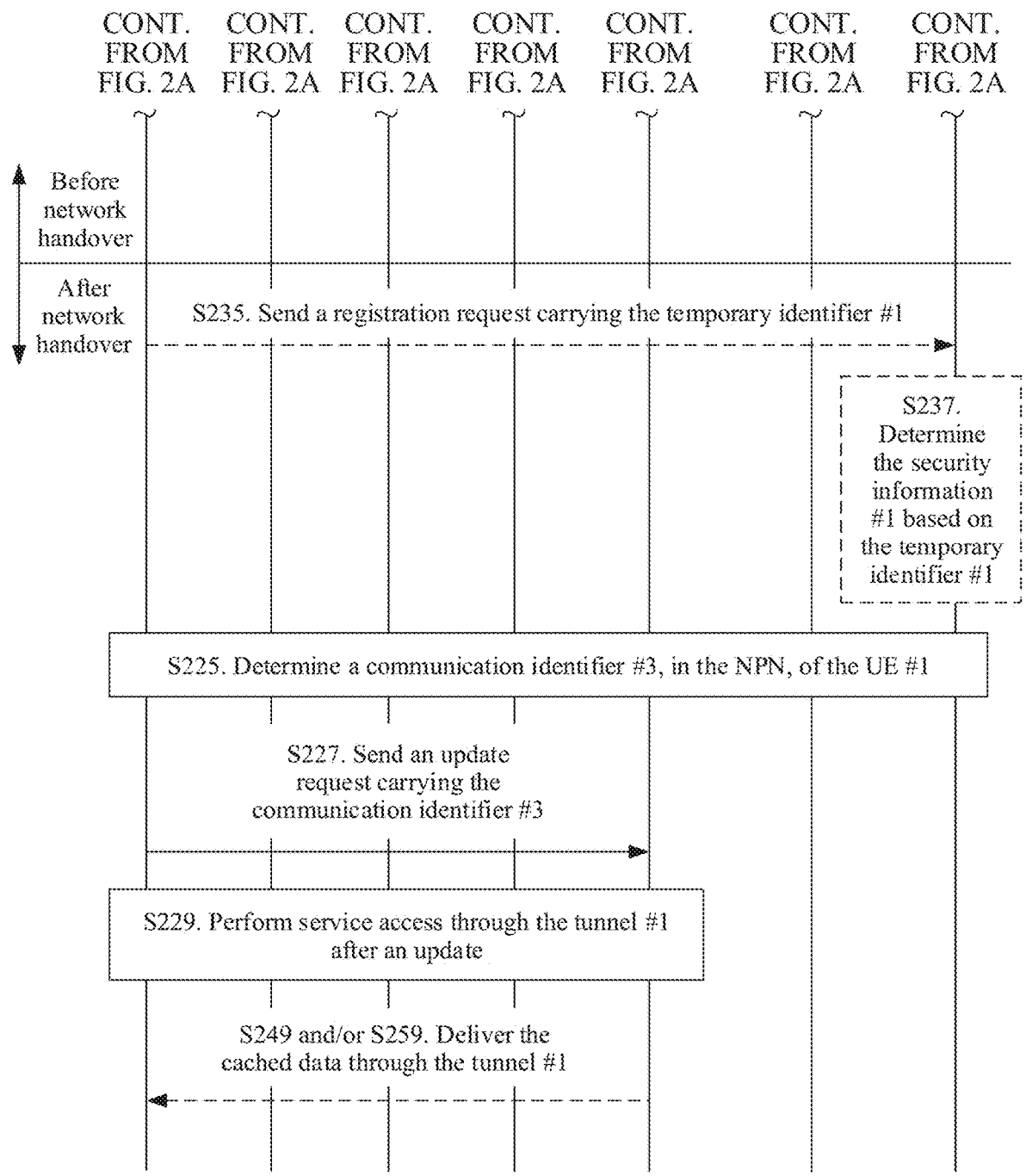

First, with reference to FIG. 2A and FIG. 2B, a process of a network handover method 200 used when the UE #1 accesses, in the PLMN, the PLMN service is described.

As shown in FIG. 2A and FIG. 2B, optionally, in S210, the UE #1 sets up a session (denoted as a session #1) with the forwarding device (for example, the UPF, denoted as the UPF #1) of the PLMN by using an access device (for example, the RAN, denoted as the RAN #1) of the PLMN. By way of example and not limitation, the session #1 may include a protocol data unit (protocol data unit, PDU) session. A process of setting up the session may be similar to that of a current technology, and to avoid repetition, detailed descriptions thereof are omitted herein. For example, in the session setup process, a session management device (for example, an SMF, denoted as an SMF #1) of the PLMN may allocate a communication identifier (denoted as a communication identifier #1) to the UE #1. For example, the communication identifier #1 may include an internet protocol (internet protocol, IP) address or an IP port. The UE #1 may use the communication identifier #1 as a local identifier used in the session #1 by the UE #1.

That "in S210, the UE #1 sets up a session with the UPF #1 by using the RAN #1" may be understood as: Data transmitted between the UE #1 and the UPF #1 through the session #1 needs to be forwarded through the RAN #1.

In other words, the session #1 may include a channel #1, and the channel #1 may be a channel between the RAN #1 and the UPF #1.

Therefore, the UE #1 may receive or send data of the PLMN service through the session #1.

It should be noted that the UE #1 may alternatively camp only on the PLMN, and does not perform service access by using the PLMN. In this case, S210 may not be performed.

In S220, when the UE #1 determines that the UE #1 needs to be handed over from the PLMN to the NPN (specifically, handed over from the RAN #1 to the access network of the NPN), or before the UE #1 needs to be handed over from the PLMN to the NPN, the UE #1 may set up a communication tunnel (denoted as a tunnel #1) to an interworking device (denoted as an interworking device #1) of the PLMN. By way of example and not limitation, the tunnel #1 may include an IP security (internet protocol security, IPsec) tunnel.

It is assumed that a communication identifier (for example, an IP address) used in the tunnel #1 by the UE #1 is a communication identifier #X.

In this case, for example, the communication identifier #X may be the communication identifier #1.

For another example, the UE #1 may alternatively set up another session (for example, a PDU session, denoted as a session #2) with the UPF #1 or another UPF (denoted as a UPF #1a). It is assumed that a local identifier used in the session #2 by the UE #1 is a communication identifier #2. In this case, the communication identifier #X may be the communication identifier #2.

In this application, a process of setting up a tunnel based on a communication identifier may be similar to that of a current technology. To avoid repetition, detailed descriptions thereof are omitted herein.

Optionally, a process of setting up the tunnel #1 may be performed in a process of registering the UE #1 with the PLMN by using the interworking device #1. For example, the interworking device #1 may obtain a key of the tunnel #1 through the foregoing registration process.

a. The UE #1 may send a registration request #1 to the interworking device #1, where the registration request #1 may carry an identifier of the UE #1, for example, a 5G globally unique temporary UE identity (5G Globally Unique Temporary UE Identity, 5G-GUTI).

In this application, a plurality of communication connections may be included between the interworking device #1 and an AMF #1. The plurality of communication connections may be in a one-to-one correspondence with a plurality of UE identifiers. Therefore, the interworking device #1 may determine a communication connection (denoted as a communication connection #1) corresponding to the identifier of the UE #1.

b. The interworking device #1 may send the registration request #1 through an N2 message #1 of the communication connection #1.

c. The AMF #1 may determine, based on the registration request #1, that the UE #1 needs to be registered, and perform registration processing.

Optionally, the registration request #1 may alternatively carry the identifier of the UE #1.

Optionally, the registration request #1 may carry a pre-registration identifier. The pre-registration identifier may be used to indicate that the UE needs to perform network handover but has not been handed over to a destination network, or the pre-registration identifier may be used to indicate that the UE needs to perform network handover but is still located in a source network.

Optionally, the registration request #1 and/or the N2 message #1 may carry target network information (for example, an identifier of the NPN), and the interworking device #1 may obtain the target network information from a setup request message, of the tunnel #1, sent by the UE and fill the target network information in the N2 message #1, so that the AMF #1 may determine, based on the target network information, a network to which the UE needs to be handed over.

For example, the AMF #1 may determine, based on the identifier of the NPN, that the UE #1 needs to be handed over from the PLMN to the NPN, so that the AMF #1 may register (for example, authenticate) the UE #1 based on a processing procedure in which the UE accesses the PLMN from the NPN.

Alternatively, the AMF #1 may determine, based on the pre-registration identifier, that the UE #1 is located in the PLMN, so that the AMF #1 may register (for example, authenticate) the UE #1 based on a processing procedure in which the UE accesses the PLMN from a RAN of the PLMN.

Alternatively, in this application, registration processing procedures for different access technologies may be the same. To be specific, when same UE performs access by using different access technologies, only one registration and access context is generated, and there is no need to generate different registration and access contexts for the different access technologies.

Alternatively, for whether the UE #1 can access the PLMN from the NPN, the AMF #1 may perform authorization based on the pre-registration identifier. The authorization may be performed based on subscription or a local policy of the UE #1.

d. After the registration is completed, the AMF #1 may send a registration completion indication to the interworking device #1, and the registration completion indication may carry an interworking key.

e. After receiving the registration completion indication, the interworking device #1 may directly use the interworking key or derive the key of the tunnel #1 based on the interworking key, and forward the registration completion indication to the UE #1.

In S225, after the UE #1 is handed over from the PLMN to the NPN, the UE #1 may set up a session (denoted as a session #3) with the forwarding device (for example, the UPF, denoted as the UPF #2) of the NPN. By way of example and not limitation, the session #3 may include a protocol data unit (protocol data unit, PDU) session. A process of setting up the session may be similar to that of a current technology, and to avoid repetition, detailed descriptions thereof are omitted herein. For example, in the session setup process, an access management device (for example, an AMF, denoted as an AMF #2) of the NPN may allocate a communication identifier (denoted as a communication identifier #3) to the UE #1. For example, the communication identifier #3 may include an IP address or an IP port.

In S227, the UE #1 may send an update request to the interworking device #1, where the update request may carry the communication identifier #3, and the update request may be used to indicate the interworking device #1 to update the local identifier used in the tunnel #1 by the UE #1 to the communication identifier #3.

In S229, the interworking device #1 may update, based on the update request, the local identifier used in the tunnel #1 by the UE #1 to the communication identifier #3.

Therefore, in the NPN, the UE #1 may use the communication identifier #3 as a local identifier, and perform service access through the tunnel #1 by using the interworking device #1.

According to the network handover method provided in this application, when the UE #1 is in the PLMN, the UE #1 sets up the tunnel #1 to the interworking device #1. In this way, after the UE #1 is handed over to the NPN, communication can be performed through the tunnel #1, provided that the local identifier used in the tunnel #1 by the UE #1 is updated. Therefore, handover processing duration caused by the tunnel setup after the network handover can be reduced.

The UE #1 may use the communication identifier #1 as the local identifier used in the session #1 by the UE #1.

Optionally, in S230, when the UE #1 determines that the UE #1 needs to be handed over from the PLMN to the NPN (specifically, handed over from the RAN #1 to the access network of the NPN), or before the UE #1 needs to be handed over from the PLMN to the NPN, the UE #1 may set up a communication tunnel (denoted as a tunnel #2) to an interworking device (denoted as an interworking device #2) of the NPN. By way of example and not limitation, the tunnel #2 may include an IPsec tunnel.

A process of setting up the tunnel #2 may be similar to that of a current technology, and to avoid repetition, detailed descriptions thereof are omitted herein.

Then, the UE #1 may register with the NPN through the tunnel #2 by using the interworking device #2. A process of the registration may include the following steps.

f. The UE #1 may send a registration request #3 to the interworking device #2 through the tunnel #2, where the registration request #3 may carry the identifier of the UE #1, for example, a media access control (media access control, MAC) address, a cell phone number, an international mobile subscriber identity (international mobile subscriber identification number. IMSI), or an international mobile equipment identity (international mobile equipment identity, IMEI).

In this application, a plurality of communication connections may be included between the interworking device #2 and the access management device (for example, the AMF, denoted as the AMF #2) that is of the NPN. The plurality of communication connections may be in a one-to-one correspondence with a plurality of UE identifiers. Therefore, the interworking device #2 may determine a communication connection (denoted as a communication connection #2) corresponding to the identifier of the UE #1.

g. The interworking device #2 may send a registration request #3 through an N2 message #2 of the communication connection #2.

h. The AMF #2 determines, based on the registration request #3, that the UE #1 needs to be registered, and performs registration processing. For example, the AMF #2 may determine security information (denoted as security information #1) used in the NPN by the UE #1, and the AMF #2 may allocate a temporary identifier (denoted as a temporary identifier #1) to the UE #1.

In addition, the AMF #2 may record registration information, and the registration information may be used to indicate a correspondence between the temporary identifier #1 and the security information #1.

Optionally, the registration request #3 and the N2 message #2 may carry source network information (for example, an identifier of the PLMN or location information of the PLMN), so that the AMF #2 may determine, based on the source network information, a network in which the UE is currently located. For example, the AMF #2 may determine, based on the identifier of the PLMN, that the UE #1 is currently in a range of the PLMN, so that the AMF #2 may register (for example, authenticate) the UE #1 based on a processing procedure in which the UE accesses the NPN from the PLMN.

In S235, after the UE #1 is handed over from the PLMN to the NPN, the UE #1 may send a registration request #5 to the AMF #2 through an access device (for example, a RAN, denoted as a RAN #2) of the NPN, where the registration request #5 may carry the temporary identifier #1.

In S237, the AMF #2 may determine, based on the registration information, the security information #1 corresponding to the temporary identifier #1.

According to the network handover method provided in this application, when the UE #1 is in the PLMN, a process of registering the UE #1 with the NPN is performed by using the interworking device #2, so that the UE #1 can be authenticated in and/or registered with the NPN before the UE #1 is handed over to the NPN. In this way, handover processing duration caused by authentication and/or registration after the network handover can be reduced.

In addition, in this application, S230. S235, and S237 may not be indicated. In this case, the UE #1 may be registered after being handed over to the NPN.

It should be noted that a sequence of performing S220 and S230 is not particularly limited in this application. To be specific, S220 may be performed before S230, or S220 may be performed after S230.

Optionally, in S240, before the UE #1 is handed over from the PLMN to the NPN, the UE #1 may indicate the interworking device #1 to set up a channel #2 to the UPF #1, where the channel #2 belongs to the session #1.

For example, the UE #1 may send a session setup request to the AMF #1 through the interworking device #1, and the session setup request may include an identifier of the session #1.

The AMF #1 may send a session setup context to the session management device (for example, the SMF, denoted as the SMF #1) of the PLMN based on the session setup request.

The SMF #1 sends a session setup indication to the UPF #1 based on the session setup context.

As described above, the channel #1 of the session #1 is already set up in S210. Therefore, in a current technology, after the channel #2 is set up, a device such as the AMF #1, the SMF #1, or the UPF #1 may initiate a resource release process for the channel #1.

However in this application, when the channel #2 is set up, the UE #1 is still located in the PLMN, a downlink channel does not need to be switched to the channel #2, and a resource of the channel #1 does not need to be released. If a downlink channel switching process is initiated, a transmission delay of a service accessed by the UE #1 through the session #1 may increase.

Therefore, in this application, the session setup request may carry a pre-handover (pre-handover) indication, and the pre-handover indication may be used to indicate that releasing the resource of the channel #1 is forbidden.

Specifically, the pre-handover indication is sent in the session setup request by the UE #1 to the SMF #1 through the AMF #1, and the SMF #1 sends the pre-handover indication to the UPF #1. Based on the indication, the UPF #1 temporarily does not switch the downlink channel to a side of the interworking device #1, and based on the indication, the SMF #1 temporarily does not initiate the resource release process for the channel #1.

In S245, after the channel #2 is set up, the UPF #1 may send downlink data of the UE #1 through the channel #2.

In S247, the interworking device #1 may cache the received downlink data of the channel #2.

In S249, the interworking device #1 may send the cached data to the UE #1 after determining that the update for the tunnel #1 (to be specific, the update of the local communication identifier used in the tunnel #1 by the UE #1) is completed.

It should be noted that, for example, in this application, after the channel #2 is set up, the UPF #1 may send the downlink data of the UE #1 through the channel #2 by default. That is, the UE does not need to send the pre-handover indication, and directly performs step S245.

Steps S247 and S249 may alternatively be performed by default after S245. If the interworking device #1 determines, according to an operator policy or a local policy, that the UE #1 is currently in the PLMN, the interworking device #1 caches the received downlink data. In another possible manner, steps S247 and S249 are triggered by the UE. Specifically, after the PDU session is set up, the UE sends an IKEv2_INFORMATIONAL message to the interworking device #1, where the message carries a downlink data cache notification (DL Data Cache Notification) indication, and optionally, further carries a PDU session identifier, and the interworking device #1 determines, based on the downlink data cache notification indication, that downlink data of the session #1 needs to be cached.

Alternatively, in this application, for example, after the channel #2 is set up, the UPF #1 may still send the downlink data of the UE #1 through the channel #1. In this case, the UE #1 may send a channel switching indication to the UPF #1, and the channel switching indication may be used to indicate the UPF #1 to send the downlink data of the UE #1 through the channel #2.

By way of example and not limitation, the UE #1 may send the channel switching indication when determining that the UE #1 is to be handed over to the target NPN network.

In a specific possible implementation, after the PDU session is set up, the UE #1 sends an IKEv2_INFORMATIONAL message to the interworking device #1, where the message carries a downlink data cache notification (DL Data Cache Notification) indication, and optionally, further carries a PDU session identifier, and the interworking device #1 determines, based on the downlink data cache notification indication, that downlink data of the session #1 needs to be cached.

Optionally, the interworking device #1 sends an N2 message to the AMF #1, where the N2 message includes a channel switching indication or a downlink data cache notification indication.

Optionally, the UE sends a PDU session modification request to the AMF #1, where the PDU session modification request includes a channel switching indication or a downlink data cache notification indication.

After receiving the channel switching indication or the downlink data cache notification indication, the AMF #1 sends the indication to the SMF #1. Specifically, the AMF #1 may send PDU session context modification information to transfer the indication to the SMF #1. The SMF #1 sends an N4 message to the UPF #1, where the N4 message includes a channel switching indication. The UPF #1 switches a downlink channel of the session #1 to the interworking device #1 based on the channel switching indication. The SMF #1 may further determine, based on the channel switching indication and according to an operator policy or a local policy, whether to initiate release of a resource of the channel #1 of the session #1.

In another specific possible implementation, the UE includes a channel switching indication or a downlink data cache notification (DL Data Cache Notification) indication in the session setup request in S240, the PDU session setup request is sent to the SMF #1 through the AMF #1, and after receiving the PDU session setup request, the SMF #1 may send the N4 message to the UPF #1, where the N4 message includes the channel switching indication or the downlink data cache notification indication. The UPF #1 switches the downlink channel of the session #1 to the interworking device #1. The SMF #1 may further determine, based on the channel switching indication and the downlink data cache notification indication and according to an operator policy or a local policy, whether to initiate release of a resource of the channel #1 of the session #1. The SMF #1 sends N2 SM information including a channel switching indication or a downlink data cache notification (DL Data Cache Notification) to the interworking device #1, and the interworking device #1 determines, based on the indication, that the downlink data of the session #1 needs to be cached.

It should be noted that a sequence of performing S220, S230, and S240 is not particularly limited in this application.

According to the network handover method provided in this application, the interworking device #1 sets up the session with the UPF #1 by using the interworking device #1 before the UE #1 is handed over to the NPN, so that the interworking device can cache the downlink data of the UE #1 in the handover process of the UE #1, and deliver the cached data after the UE #1 completes the handover. In this way, continuity and reliability of communication of the UE #1 can be ensured, and user experience can be further improved.

Optionally, in S250, before the UE #1 is handed over from the PLMN to the NPN, the UE #1 triggers setting up a forwarding tunnel between the interworking device #1 and the RAN #1.

In this application, a process of setting up the forwarding tunnel may be triggered in any one of the following manners.

Manner 1

The UE #1 may send NPN measurement information to the RAN #1.

When the measurement information meets a preset network handover condition, the RAN #1 sends a network handover request (for example, handover required) to the AMF #1, where the network handover request carries an NPN indication or identifier and an indirect data forwarding tunnel indication.

The AMF #1 sends an N2 message to the interworking device #1 based on the network handover request, where the N2 message carries an indirect data forwarding tunnel indication. The N2 message may be a handover request or another N2 message. This is not limited herein. The interworking device #1 allocates a forwarding tunnel identifier, and sends the forwarding tunnel identifier to the AMF #1 through a response message of the N2 message, for example, a handover request acknowledge message or another N2 message. The AMF #1 sends the forwarding tunnel identifier of the interworking device #1 to the SMF #1. The SMF #1 sends the forwarding tunnel identifier to the UPF #1 through an N4 message. The SMF #1 or the UPF #1 allocates a forwarding tunnel identifier of the UPF #1, and sends the N2 SM information including the forwarding tunnel identifier to the RAN #1 through the AMF #1.

Manner 2

The UE #1 may send a forwarding tunnel setup indication to the interworking device #1.

The interworking device #1 sets up a forwarding tunnel to the RAN #1 based on the forwarding tunnel setup indication.

In addition, during the setup of the forwarding tunnel, the interworking device #1 allocates a forwarding tunnel identifier (denoted as a forwarding tunnel identifier #1) of the interworking device #1, and sends the forwarding tunnel identifier to the AMF #1 through an N2 message. For example, the interworking device #1 may send the forwarding tunnel identifier #1 to the AMF #1 through an N2 path switch request (N2 path switch request) or another N2 message. The AMF #1 sends the forwarding tunnel identifier of the interworking device #1 to the SMF #1. The SMF #1 sends the forwarding tunnel identifier to the UPF #1 through an N4 message. The SMF #1 or the UPF #1 allocates the forwarding tunnel identifier of the UPF #1, and sends the N2 SM information including the forwarding tunnel identifier to the RAN #1 through the AMF #1.

In this way, the setup of the forwarding tunnel is completed.

Optionally, the AMF #1 may send a forwarding tunnel setup completion indication to the interworking device #1 through an N2 message. Alternatively, after the interworking device #1 sends, to the AMF #1, the forwarding tunnel identifier allocated by the interworking device #1, the interworking device #1 may send a forwarding tunnel setup completion indication to the UE #1.

Alternatively, the RAN #1 may send a forwarding tunnel setup completion indication to the UE #1.

Therefore, the UE #1 may determine, based on the forwarding tunnel setup completion indication, that the setup of the forwarding tunnel is completed, so as to trigger a process of network handover from the PLMN to the NPN.

In S255, after the forwarding tunnel is set up, the RAN #1 may send the downlink data of the UE #1 through the forwarding tunnel.

In S257, the interworking device #1 may cache received downlink data of the forwarding tunnel.

In S259, the interworking device #1 may send the cached data to the UE #1 after determining that the update for the tunnel #1 (to be specific, the update of the local communication identifier used in the tunnel #1 by the UE #1) is completed.

It should be noted that a sequence of performing S220, S230, and S250 is not particularly limited in this application.

According to the network handover method provided in this application, the setup of the forwarding tunnel between the RAN #1 and the interworking device #1 is triggered before the UE #1 is handed over to the NPN, so that the interworking device can cache the downlink data of the UE #1 in the handover process of the UE #1, and deliver the cached data after the UE #1 completes the handover. In this way, the continuity and the reliability of the communication of the UE #1 can be ensured, and user experience can be further improved.

It should be noted that, either of or both S240 and S250 (to be specific, the setup of the session #4 and the setup of the forwarding tunnel) may be performed. This is not limited in this application.

In addition, a sequence of performing S240 and S250 is not particularly limited in this application. To be specific, S240 may be performed before S250, or S240 may be performed after S250.

In the following, with reference to FIG. 3A and FIG. 3B, a process of a network handover method 300 used when UE #A accesses, in a PLMN, an NPN service is described.

Figure 3A:
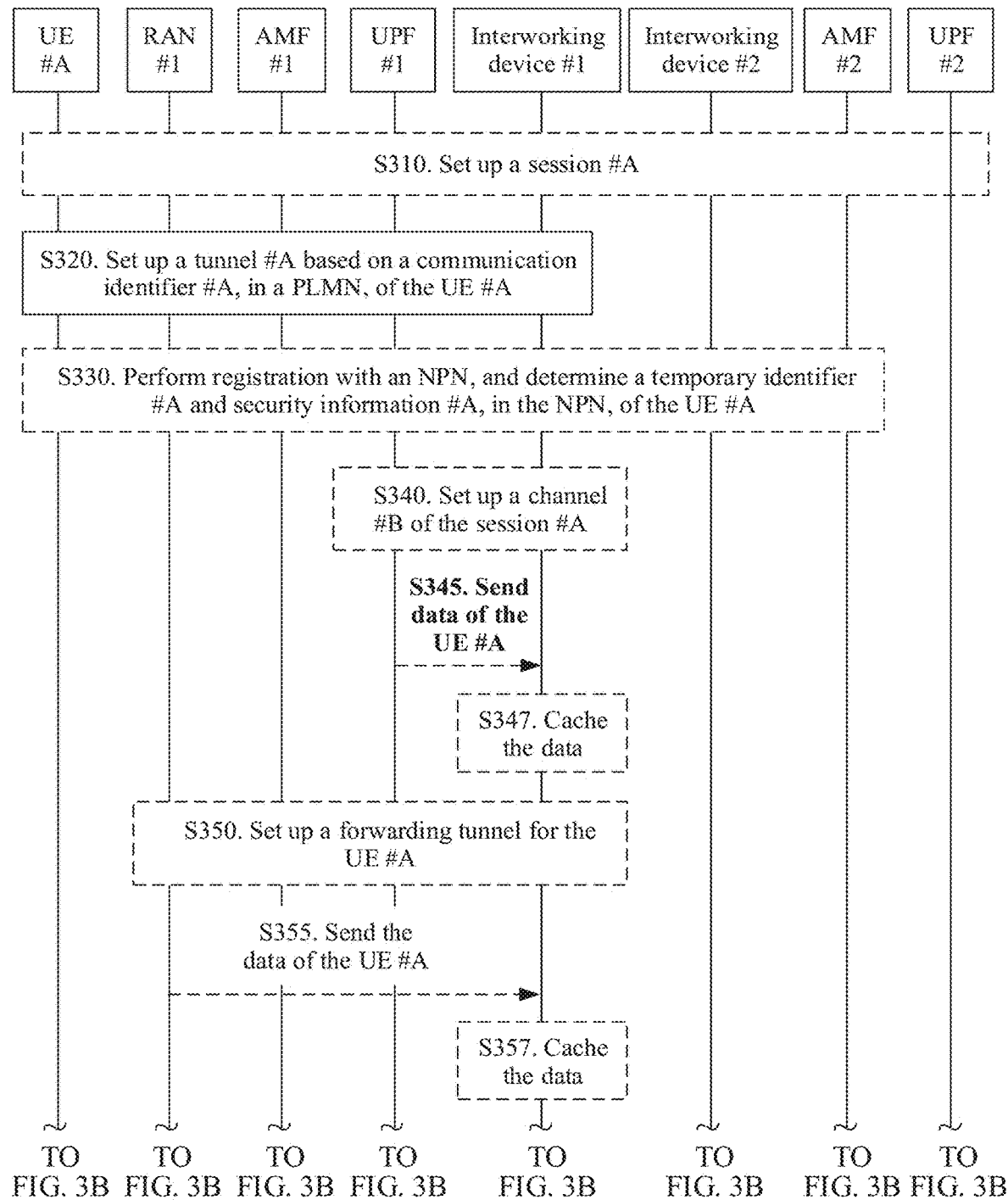
FIG. 3A and FIG. 3B is a schematic interaction diagram of another example of a network handover method according to this application.
Figure 3B:
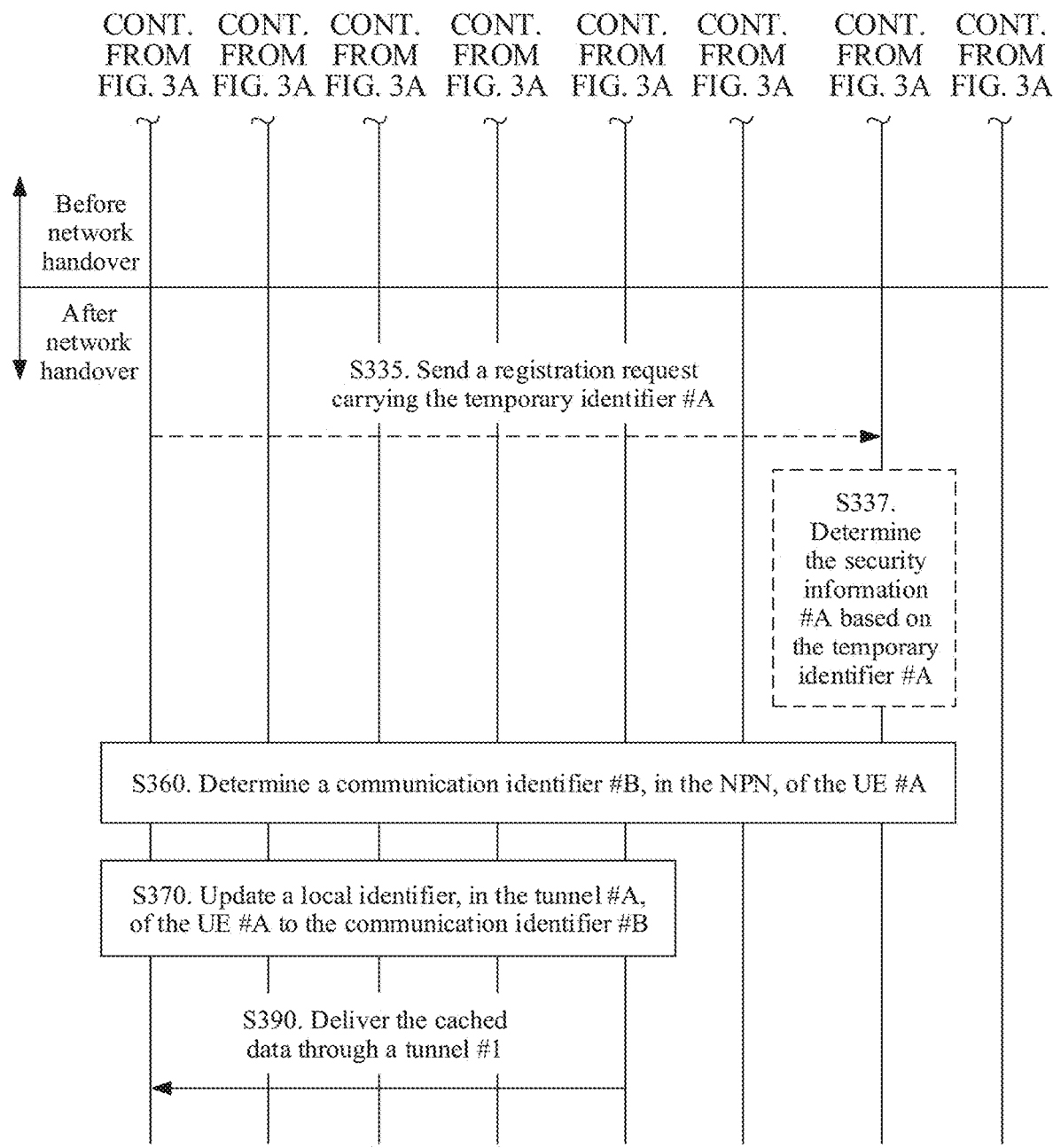

As shown in FIG. 3A and FIG. 3B, optionally, in S310, the UE #A sets up a session #B with a forwarding device (for example, a UPF #1) of the PLMN by using an access device (for example, a RAN #1) of the PLMN. The UE #A sets up a tunnel #B to an interworking device (for example, an interworking device #2) of the NPN by using the session #B. The UE #A sets up a session (denoted as a session #A) with a forwarding device (for example, a UPF #2) of the NPN by using a tunnel #B. By way of example and not limitation, the session #A may include a protocol data unit (protocol data unit, PDU) session. A process of setting up the session may be similar to that of a current technology, and to avoid repetition, detailed descriptions thereof are omitted herein.

The session #B includes a channel #A, and the channel #A is a channel between the RAN #1 and the UPF #1.

Therefore, the UE #A may receive or send data of the NPN service through the session #A.

It should be noted that, when the UE #A determines that the NPN service needs to be used, or before S310 is performed, and before the UE #A needs to be handed over from the PLMN to the NPN, the UE #A sets up a communication tunnel (denoted as the tunnel #B) to the interworking device (for example, the interworking device #2) of the NPN. By way of example and not limitation, the tunnel #B may include an IPsec tunnel.

A process of setting up the tunnel #B may be similar to that of a current technology, and to avoid repetition, detailed descriptions thereof are omitted herein.

Then, the UE #A may perform authentication in and/or registration with the NPN through the tunnel #B by using the interworking device #2. The process may be similar to that of a current technology, and to avoid repetition, detailed descriptions thereof are omitted herein.

In S320, when the UE #A determines that the UE #A needs to be handed over from the PLMN to the NPN (specifically, handed over from the RAN #1 to the access network of the NPN), or before the UE #A needs to be handed over from the PLMN to the NPN, the UE #A may set up a communication tunnel (denoted as a tunnel #A) to an interworking device (for example, the interworking device #1) of the PLMN. By way of example and not limitation, the tunnel #A may include an IPsec tunnel.

It is assumed that a communication identifier (for example, an IP address) used in the tunnel #A by the UE #A is a communication identifier #A.

In this way, for example, the communication identifier #A may be an identifier allocated by the PLMN to the UE #A, or the communication identifier #A may be an identifier used in the PLMN by the UE #A.

In this application, a process of setting up a tunnel based on a communication identifier may be similar to that of a current technology. To avoid repetition, detailed descriptions thereof are omitted herein.

In S335, after the UE #A is handed over from the PLMN to the NPN, the UE #A may send a registration request to the AMF #2 through an access device (for example, the RAN #2) of the NPN, where the registration request may carry the communication identifier #A.

In S337, the AMF #2 may determine, based on the registration information, security information #A corresponding to the temporary identifier #A.

According to the network handover method provided in this application, when the UE #A is in the PLMN, a process of registering the UE #A with the NPN is performed, so that the UE #A can be registered with the NPN before the UE #A is handed over to the NPN. In this way, handover processing duration caused by registration after the network handover can be reduced.

In addition, in this application, S330, S335, and S337 may not be indicated. In this case, the UE #A may be registered after being handed over to the NPN.

It should be noted that a sequence of performing S320 and S330 is not particularly limited in this application. To be specific. S320 may be performed before S330, or S320 may be performed after S330.

Optionally, in S340, before the UE #A is handed over from the PLMN to the NPN, the UE #A may indicate the interworking device #1 to set up a channel #B to the UPF #1, where the channel #B belongs to the session #B.

By way of example and not limitation, the channel #B may be an N3 channel of a PDU session.

For example, the UE #A may send a session setup request to the AMF #1 through the interworking device #1, and optionally, the session setup request may include an identifier of the session #B.

The AMF #1 may send a session setup context to the session management device (for example, the SMF #1) of the PLMN based on the session setup request.

The SMF #1 sends a session setup indication to the UPF #1 based on the session setup context.

As described above, the channel #A of the session #B is already set up in S310. Therefore, in a current technology, after the channel #B is set up, a device such as the AMF #1, the SMF #1, or the UPF #1 may initiate a resource release process for the channel #A.

However, in this application, during the setup of the channel #B, the UE #A is still located in the PLMN, the downlink channel does not need to be switched to the channel #B, and a resource of the channel #A does not need to be released. If a downlink channel switching process is initiated, a service transmission delay of a service accessed by the UE #A by using the session #B may increase.

Therefore, in this application, the session setup request may carry a pre-handover (pre-handover) indication, and the pre-handover indication may be used to indicate that releasing the resource of the channel #A is forbidden. Specifically, the pre-handover indication is sent in the session setup request by the UE #A to the SMF #1 through the AMF #1, and the SMF #1 sends the pre-handover indication to the UPF #1. Based on the indication, the UPF #1 temporarily does not switch the downlink channel to a side of the interworking device #1, and based on the indication, the SMF #1 temporarily does not initiate the resource release procedure for the channel #A.

In S345, after the channel #B is set up, the UPF #1 may send downlink data of the UE #A through the channel #B.

In S347, the interworking device #1 may cache the received downlink data of the channel #B.

It should be noted that, for example, in this application, after the channel #B is set up, the UPF #1 may send the downlink data of the UE #A through the session #B by default. That is, the UE does not need to send the pre-handover indication, and directly performs step S345. Steps S347 and S349 may alternatively be performed by default after S345. If the interworking device #1 determines, according to an operator policy or a local policy, that the UE #A is currently in the PLMN, the interworking device #1 caches the received downlink data. In another possible manner, steps S347 and S349 are triggered by the UE #A. Specifically, after the PDU session is set up, the UE #A sends an IKEv2_INFORMATIONAL message to the interworking device #1, where the message carries a downlink data cache notification (DL Data Cache Notification) indication, and optionally, further carries a PDU session identifier, and the interworking device #1 determines, based on the downlink data cache notification indication, that downlink data of the session #B needs to be cached.

Alternatively, in this application, for example, after the channel #B is set up, the UPF #1 may still send the downlink data of the UE #A through the channel #A. In this case, the UE #A may send a channel switching indication to the UPF #1, and the channel switching indication may be used to indicate the UPF #1 to use a channel (for example, the channel #B) of the interworking device #1 to send the downlink data of the UE #A. The UE #A may send the channel switching indication when determining that the UE #A is to be handed over to the target NPN network.

In a specific possible implementation, after the PDU session is set up, the UE #A sends an IKEv2_INFORMATIONAL message to the interworking device #1, where the message carries a downlink data cache notification (DL Data Cache Notification) indication, and optionally, further carries a PDU session identifier, and the interworking device #1 determines, based on the downlink data cache notification indication, that downlink data of the channel #B needs to be cached.

Optionally, the interworking device #1 sends an N2 message to the AMF #1, where the N2 message includes a channel switching indication or a downlink data cache notification indication.

Optionally, the UE sends a PDU session modification request to the AMF #1, where the PDU session modification request includes a channel switching indication or a downlink data cache notification indication.

After receiving the channel switching indication or the downlink data cache notification indication, the AMF #1 sends the indication to the SMF #1. Specifically, the AMF #1 may send PDU session context modification information to transfer the indication to the SMF #1. The SMF #1 sends an N4 message to the UPF #1, where the N4 message includes a channel switching indication. The UPF #1 switches a downlink channel of the session #B to the interworking device #1 based on the channel switching indication. The SMF #1 may further determine, based on the channel switching indication and according to an operator policy or a local policy, whether to initiate release of a resource of the channel #A of the session #B.

In another specific possible implementation, the UE includes a channel switching indication or a downlink data cache notification (DL Data Cache Notification) indication in the session setup request in S340, the PDU session setup request is sent to the SMF #1 through the AMF #1, and after receiving the PDU session setup request, the SMF #1 sends the N4 message to the UPF #1, where the N4 message includes the channel switching indication or the downlink data cache notification indication. The UPF #A switches the downlink channel of the session #B to the interworking device #1. The SMF #1 may further determine, based on the channel switching indication and the downlink data cache notification indication and according to an operator policy or a local policy, whether to initiate release of a resource of the channel #A of the session #B. The SMF #1 sends N2 SM information including a channel switching indication or a downlink data cache notification (DL Data Cache Notification) to the interworking device #1, and the interworking device #1 determines, based on the indication, that the downlink data of the session #B needs to be cached.

It should be noted that a sequence of performing S320, S330, and S340 is not particularly limited in this application.

According to the network handover method provided in this application, the interworking device #1 sets up the session with the UPF #1 by using the interworking device #1 before the UE #A is handed over to the NPN, so that the interworking device can cache the downlink data of the UE #A in the handover process of the UE #A, and deliver the cached data after the UE #A completes the handover. In this way, continuity and reliability of communication of the UE #A can be ensured, and user experience can be further improved.

Optionally, in S350, before the UE #A is handed over from the PLMN to the NPN, the UE #A triggers setting up a forwarding tunnel between the interworking device #1 and the RAN #1.

For example, the UE #A may send NPN measurement information to the RAN #1. When the measurement information meets a preset network handover condition, the RAN #1 sends a network handover request (handover required) to the AMF #1, where the network handover request carries an NPN indication or identifier and an indirect data forwarding tunnel indication. The AMF #1 sends an N2 message to the interworking device #1 based on the network handover request, where the N2 message carries an indirect data forwarding tunnel indication. The N2 message may be a handover request or another N2 message. This is not limited herein. The interworking device #1 allocates a forwarding tunnel identifier, and sends the forwarding tunnel identifier to the AMF #1 through a response message of the N2 message, for example, a handover request acknowledge message. The AMF #1 sends the forwarding tunnel identifier of the interworking device #1 to the SMF #1. The SMF #1 sends the forwarding tunnel identifier to the UPF #1 through an N4 message. The SMF #1 or the UPF #1 allocates the forwarding tunnel identifier of the UPF #1, and sends the N2 SM information including the forwarding tunnel identifier to the RAN #1 through the AMF #1.

For another example, the UE #A may send a forwarding tunnel setup indication to the interworking device #1. The interworking device #1 sets up a forwarding tunnel to the RAN #1 based on the forwarding tunnel setup indication. In addition, in a forwarding tunnel setup process, the interworking device #1 determines a forwarding tunnel identifier (denoted as a forwarding tunnel identifier #1) of the interworking device #1, and sends the forwarding tunnel identifier to the AMF #1 through an N2 message. For example, the interworking device #1 may send the forwarding tunnel identifier #1 through an N2 message to the AMF #1. The AMF #1 sends the forwarding tunnel identifier of the interworking device #1 to the SMF #1. The SMF #1 sends the forwarding tunnel identifier to the UPF #1 through an N4 message. The SMF #1 or the UPF #1 allocates the forwarding tunnel identifier of the UPF #1, and sends N2 SM information including the forwarding tunnel identifier to the RAN #1 through the AMF #1.

In this way, the setup of the forwarding tunnel is completed.

Optionally, the AMF #1 may send a forwarding tunnel setup completion indication to the interworking device #1 through an N2 message.

Alternatively, after the interworking device #1 sends, to the AMF #1, the forwarding tunnel identifier allocated by the interworking device #1, the interworking device #1 may send a forwarding tunnel setup completion indication to the UE #A.

Alternatively, the RAN #1 may send a forwarding tunnel setup completion indication to the UE #A.

Therefore, the UE #A may determine, based on the forwarding tunnel setup completion indication, that the setup of the forwarding tunnel is completed, so as to trigger a process of network handover from the PLMN to the NPN.

In S355, after the forwarding tunnel is set up, the RAN #1 may send the downlink data of the UE #A through the forwarding tunnel.

In S357, the interworking device #1 may cache received downlink data of the forwarding tunnel.

It should be noted that a sequence of performing S320, S330, and S350 is not particularly limited in this application.

According to the network handover method provided in this application, the setup of the forwarding tunnel between the RAN #1 and the interworking device #1 is triggered before the UE #A is handed over to the NPN, so that the interworking device can cache the downlink data of the UE #A in the handover process of the UE #A, and deliver the cached data after the UE #A completes the handover. In this way, the continuity and the reliability of the communication of the UE #A can be ensured, and user experience can be further improved.

It should be noted that, either of or both S340 and S350 (to be specific, the setup of the session #4 and the setup of the forwarding tunnel) may be performed. This is not limited in this application.

In addition, a sequence of performing S340 and S350 is not particularly limited in this application. To be specific, S340 may be performed before S350, or S340 may be performed after S350.

In S360, after the UE #A is handed over from the PLMN to the NPN, the UE #A may set up a session (denoted as a session #C) with a forwarding device (for example, the UPF #2) of the NPN. By way of example and not limitation, the session #C may include a PDU session. A process of setting up the session may be similar to that of a current technology, and to avoid repetition, detailed descriptions thereof are omitted herein. For example, in the process of setting up the session, a session management device (for example, an SMF, denoted as an SMF #2) of the NPN may allocate a communication identifier (denoted as a communication identifier #B) to the UE #A. For example, the communication identifier #B may include an IP address or an IP port.

The UE #A may alternatively directly use the communication identifier in the session #A as the communication identifier #B.

In S370, the UE #A may send an update request to the interworking device #1, where the update request may carry the communication identifier #B, and the update request may be used to indicate the interworking device #1 to update a local identifier used in the tunnel #A by the UE #A to the communication identifier #B.

In addition, the interworking device #1 may update the local identifier used in the tunnel #A by the UE #A to the communication identifier #B based on the update request.

In S390, the interworking device #1 may send the cached data to the UE #A through the tunnel #A after the update.

When UE accesses, in a first network, a service of a second network, if the UE is handed over, the access may be interrupted due to the network handover. According to the network handover solution provided in this application, the interworking device of the first network caches service data, and a tunnel between the UE and the first interworking device is set up in advance. Therefore, after the UE is handed over to the second network, a local identifier of the tunnel may be updated, so that the interworking device of the first network may deliver the cached data to the UE through the tunnel. In this way, continuity and reliability of the service access can be ensured, and duration required for the network handover can be reduced.

In the following, with reference to FIG. 4, another network handover method 400 provided in this application is described by using, as an example, a process in which UE (namely, an example of a terminal device) is handed over from a PLMN (namely, an example of a first network) to an NPN (namely, an example of a second network).

Figure 4:
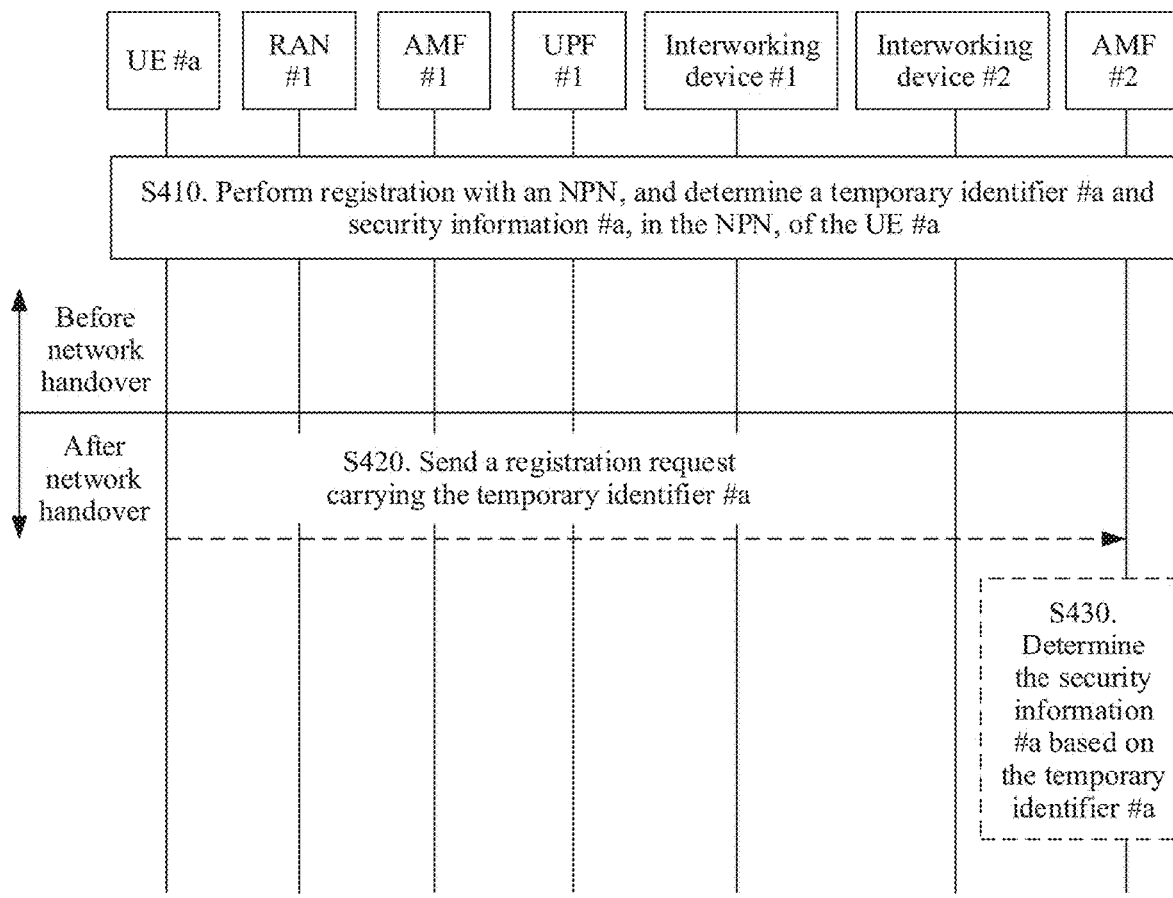
FIG. 4 is a schematic interaction diagram of still another example of a network handover method according to this application.

As shown in FIG. 4, optionally, in S410, when UE #a determines that the UE #a needs to be handed over from the PLMN to the NPN (specifically, from a RAN #1 to a RAN #2), or before the UE #a needs to be handed over from the PLMN to the NPN, the UE #a may set up a communication tunnel (denoted as a tunnel #a) to an interworking device (namely, an interworking device #2) of the NPN. By way of example and not limitation, the tunnel #a may include an IPsec tunnel.

A process of setting up the tunnel #a may be similar to that of a current technology, and to avoid repetition, detailed descriptions thereof are omitted herein.

Then, the UE #a may register with the NPN through the tunnel #a by using the interworking device #2. A process of the registration may include the following steps.

1. The UE #a may send a registration request #a to the interworking device #2 through the tunnel #a, where the registration request #a may carry an identifier of the UE #a, for example, a media access control (media access control, MAC) address, a cell phone number, an international mobile subscriber identity (international mobile subscriber identification number. IMSI), or an international mobile equipment identity (international mobile equipment identity, IMEI).

In this application, a plurality of communication connections may be included between the interworking device #2 and the access management device (for example, the AMF #2) that is of the NPN. The plurality of communication connections may be in a one-to-one correspondence with a plurality of UE identifiers. Therefore, the interworking device #2 may determine a communication connection (denoted as a communication connection #a) corresponding to the identifier of the UE #a.

2. The interworking device #2 may send a registration request #a through an N2 message #a of the communication connection #a.

3. The AMF #2 determines, based on the registration request #a, that the UE #a needs to be registered, and performs registration processing. For example, the AMF #2 may determine security information (denoted as security information #a) used in the NPN by the UE #a, and the AMF #2 may allocate a temporary identifier (denoted as a temporary identifier #a) to the UE #a.

In addition, the AMF #2 may record registration information, and the registration information may be used to indicate a correspondence between the temporary identifier #a and the security information #a.

Optionally, the registration request #a and the N2 message #a may carry source network information (for example, an identifier of the PLMN or location information of the PLMN), so that the AMF #2 may determine, based on the source network information, a network in which the UE is currently located. For example, the AMF #2 may determine, based on the identifier of the PLMN, that the UE #a is currently in a range of the PLMN, so that the AMF #2 may register (for example, authenticate) the UE #a based on a processing procedure in which the UE accesses the NPN from a RAN of the PLMN.

In S420, after the UE #a is handed over from the PLMN to the NPN, the UE #a may send a registration request #c to the AMF #2 through an access device (for example, the RAN #2) of the NPN, where the registration request #c may carry the temporary identifier #a.

In S430, the AMF #2 may determine, based on the registration information, security information #a corresponding to the temporary identifier #a.

According to the network handover method provided in this application, when the UE #a is in the PLMN, a process of registering the UE #a with the NPN is performed by using the interworking device #2, so that the UE #a can be registered with the NPN before the UE #a is handed over to the NPN. In this way, handover processing duration caused by registration after the network handover can be reduced.

It should be noted that a processing process in which the UE is handed over from the PLMN to the NPN is used as an example for description in the foregoing embodiment, but this application is not limited thereto. The solution provided in this application is also applicable to a processing process in which the UE is handed over from the NPN to the PLMN. In this case, an action performed by the interworking device #1 is replaced with an action performed by the interworking device #2, an action performed by the AMF #1 is replaced with an action performed by the AMF #2, an action performed by the SMF #1 is replaced with an action performed by the SMF #2, and an action performed by the UPF #1 is replaced with an action performed by the UPF #2.

Figure 5:
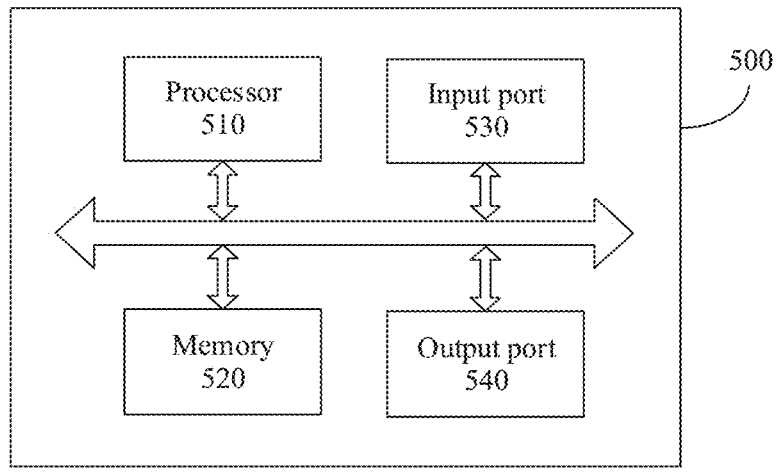
FIG. 5 is a schematic structural diagram of an example of a network handover apparatus according to this application.

According to the foregoing method, FIG. 5 is a schematic diagram 1 of a network handover apparatus (which may also be referred to as a device) 500 according to an embodiment of this application. As shown in FIG. 5, the apparatus 500 may be a terminal device (for example, the terminal device #1, the terminal device #A, or the terminal device #a), or may be a chip or a circuit, for example, a chip or a circuit that may be disposed on the terminal device.

The apparatus 500 may include a processor 510 (namely, an example of a processing unit) and a memory 520. The memory 520 is configured to store instructions, and the processor 510 is configured to execute the instructions stored in the memory 520, so that the apparatus 500 implements the steps performed by the terminal device in the foregoing method (for example, the method 200, the method 300, or the method 400).

Further, the apparatus 500 may further include an input port 530 (namely, an example of a communications unit) and an output port 540 (namely, another example of the communications unit). Further, the processor 510, the memory 520, the input port 530, and the output port 540 may communicate with each other through an internal connection path, to transmit a control signal and/or a data signal.

The memory 520 is configured to store a computer program. The processor 510 may be configured to invoke the computer program from the memory 520 and run the computer program, to control the input port 530 to receive a signal, and control the output port 540 to send a signal, to complete the steps performed by the terminal device in the foregoing method.

The memory 520 may be integrated into the processor 510, or may be separated from the processor 510.

Optionally, if the apparatus 500 is a terminal device, the input port 530 is a receiver and the output port 540 is a transmitter. The receiver and the transmitter may be a same physical entity or different physical entities. When being a same physical entity, the receiver and the transmitter may be collectively referred to as a transceiver.

Optionally, if the apparatus 500 is a chip or a circuit, the input port 530 is an input interface and the output port 540 is an output interface.

In an implementation, it may be considered that functions of the input port 530 and the output port 540 are implemented by using a transceiver circuit or a dedicated transceiver chip. It may be considered that the processor 510 is implemented by using a dedicated processing chip, a processing circuit, a processor, or a general-purpose chip.

In another implementation, it may be considered that the control device provided in this embodiment of this application is implemented by using a general-purpose computer. To be specific, program code that is used to implement functions of the processor 510, the input port 530, and the output port 540 is stored in the memory 520, and a general-purpose processor implements the functions of the processor 510, the input port 530, and the output port 540 by executing the code in the memory 520.

The modules or units in the apparatus 500 that are listed above may be configured to perform the actions or processing processes performed by the terminal device in the method 200, 300, or 400. To avoid repetition, detailed descriptions are omitted herein.

For concepts, explanations, detailed descriptions, and other steps of the apparatus 500 that are related to the technical solutions provided in the embodiments of this application, refer to the descriptions of the content in the foregoing methods or other embodiments. Details are not described herein again.

In a possible implementation, with development of a system-on-a-chip (System-on-a-chip, SoC) technology, all or some functions of the apparatus 10 are implemented by using the SoC technology, for example, implemented by using a terminal device function chip. The terminal device function chip integrates components such as a processor, a memory, and a communications interface. A program of a function related to the terminal device is stored in the memory. The processor executes the program to implement a function related to the terminal device. Optionally, the terminal device function chip can also read a memory outside the chip to implement a function related to the terminal device.

It should be understood that a structure of the apparatus 500 shown in FIG. 5 is merely a possible form, but should not constitute any limitation to the embodiments of this application. According to this application, there may be a terminal device structure in another form in the future.

Figure 6:
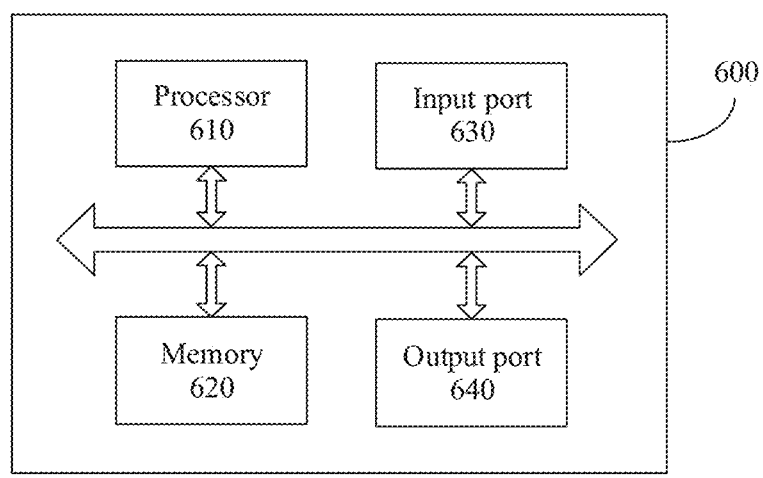
FIG. 6 is a schematic structural diagram of another example of a network handover apparatus according to this application.

According to the foregoing method, FIG. 6 is a schematic diagram 1 of a network handover apparatus (which may also be referred to as a device) 600 according to an embodiment of this application. As shown in FIG. 6, the apparatus 600 may be an interworking device (for example, the interworking device #1), or may be a chip or a circuit, for example, a chip or a circuit that may be disposed on the interworking device.

The apparatus 600 may include a processor 610 (namely, an example of a processing unit) and a memory 620. The memory 620 is configured to store instructions, and the processor 610 is configured to execute the instructions stored in the memory 620, so that the apparatus 600 implements the steps performed by the interworking device #1 in the foregoing method (for example, the method 200, the method 300, or the method 400).

Further, the apparatus 600 may further include an input port 630 (namely, an example of a communications unit) and an output port 640 (namely, another example of the communications unit). Further, the processor 610, the memory 620, the input port 630, and the output port 640 may communicate with each other through an internal connection path, to transmit a control signal and/or a data signal.

The memory 620 is configured to store a computer program. The processor 610 may be configured to invoke the computer program from the memory 620 and run the computer program, to control the input port 630 to receive a signal, and control the output port 640 to send a signal, to complete the steps performed by the terminal device in the foregoing method.

The memory 620 may be integrated into the processor 610, or may be separated from the processor 610.

Optionally, if the apparatus 600 is a terminal device, the input port 630 is a receiver and the output port 640 is a transmitter. The receiver and the transmitter may be a same physical entity or different physical entities. When being a same physical entity, the receiver and the transmitter may be collectively referred to as a transceiver.

Optionally, if the apparatus 600 is a chip or a circuit, the input port 630 is an input interface and the output port 640 is an output interface.

In an implementation, it may be considered that functions of the input port 630 and the output port 640 are implemented by using a transceiver circuit or a dedicated transceiver chip. It may be considered that the processor 610 is implemented by using a dedicated processing chip, a processing circuit, a processor, or a general-purpose chip.

In another implementation, it may be considered that the control device provided in this embodiment of this application is implemented by using a general-purpose computer. To be specific, program code that is used to implement functions of the processor 610, the input port 630, and the output port 640 is stored in the memory 620, and a general-purpose processor implements the functions of the processor 610, the input port 630, and the output port 640 by executing the code in the memory 620.

The modules or units in the apparatus 600 that are listed above may be configured to perform the actions or processing processes performed by the interworking device #1 in the method 200, 300, or 400. To avoid repetition, detailed descriptions are omitted herein.

For concepts, explanations, detailed descriptions, and other steps of the apparatus 600 that are related to the technical solutions provided in the embodiments of this application, refer to the descriptions of the content in the foregoing methods or other embodiments. Details are not described herein again.

In a possible implementation, with development of a system-on-chip (System-on-chip, SoC) technology, all or some functions of the apparatus 10 are implemented by using the SoC technology, for example, implemented by using an interworking device function chip. The interworking device function chip integrates components such as a processor, a memory, and a communications interface. A program of a function related to the interworking device is stored in the memory. The processor executes the program to implement a function related to the interworking device. Optionally, the interworking device function chip can also read a memory outside the chip to implement a function related to the interworking device.

It should be understood that a structure of the apparatus 600 shown in FIG. 6 is merely a possible form, but should not constitute any limitation to the embodiments of this application. According to this application, there may be an interworking device structure in another form in the future.

Figure 7:
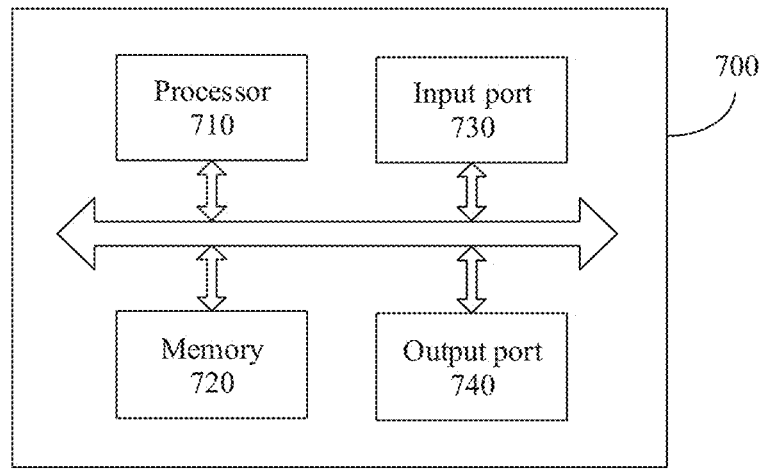
FIG. 7 is a schematic structural diagram of still another example of a network handover apparatus according to this application.

According to the foregoing method, FIG. 7 is a schematic diagram 1 of a network handover apparatus (which may also be referred to as a device) 700 according to an embodiment of this application. As shown in FIG. 7, the apparatus 700 may be a forwarding device (for example, the forwarding device #1), or may be a chip or a circuit, for example, a chip or a circuit that may be disposed on the forwarding device.

The apparatus 700 may include a processor 710 (namely, an example of a processing unit) and a memory 720. The memory 720 is configured to store instructions, and the processor 710 is configured to execute the instructions stored in the memory 720, so that the apparatus 7M) implements the steps performed by the forwarding device #1 in the foregoing method (for example, the method 200, the method 300, or the method 400).

Further, the apparatus 700 may further include an input port 730 (namely, an example of a communications unit) and an output port 740 (namely, another example of the communications unit). Further, the processor 710, the memory 720, the input port 730, and the output port 740 may communicate with each other through an internal connection path, to transmit a control signal and/or a data signal.

The memory 720 is configured to store a computer program. The processor 710 may be configured to invoke the computer program from the memory 720 and run the computer program, to control the input port 730 to receive a signal, and control the output port 740 to send a signal, to complete the steps performed by the terminal device in the foregoing method.

The memory 720 may be integrated into the processor 710, or may be separated from the processor 710.

Optionally, if the apparatus 700 is a terminal device, the input port 730 is a receiver and the output port 740 is a transmitter. The receiver and the transmitter may be a same physical entity or different physical entities. When being a same physical entity, the receiver and the transmitter may be collectively referred to as a transceiver.

Optionally, if the apparatus 700 is a chip or a circuit, the input port 730 is an input interface and the output port 740 is an output interface.

In an implementation, it may be considered that functions of the input port 730 and the output port 740 are implemented by using a transceiver circuit or a dedicated transceiver chip. It may be considered that the processor 710 is implemented by using a dedicated processing chip, a processing circuit, a processor, or a general-purpose chip.

In another implementation, it may be considered that the control device provided in this embodiment of this application is implemented by using a general-purpose computer. To be specific, program code that is used to implement functions of the processor 710, the input port 730, and the output port 740 is stored in the memory 720, and a general-purpose processor implements the functions of the processor 710, the input port 730, and the output port 740 by executing the code in the memory 720.

The modules or units in the apparatus 700 that are listed above may be configured to perform the actions or processing processes performed by the forwarding device #1 in the method 200, 300, or 400. To avoid repetition, detailed descriptions are omitted herein.

For concepts, explanations, detailed descriptions, and other steps of the apparatus 700 that are related to the technical solutions provided in the embodiments of this application, refer to the descriptions of the content in the foregoing methods or other embodiments. Details are not described herein again.

In a possible implementation, with development of a system-on-chip (System-on-chip, SoC) technology, all or some functions of the apparatus 10 are implemented by using the SoC technology, for example, implemented by using a forwarding device function chip. The forwarding device function chip integrates components such as a processor, a memory, and a communications interface. A program of a function related to the forwarding device is stored in the memory. The processor executes the program to implement a function related to the forwarding device. Optionally, the forwarding device function chip can also read a memory outside the chip to implement a function related to the forwarding device.

It should be understood that a structure of the apparatus 700 shown in FIG. 7 is merely a possible form, but should not constitute any limitation to the embodiments of this application. According to this application, there may be a forwarding device structure in another form in the future.

Figure 8:
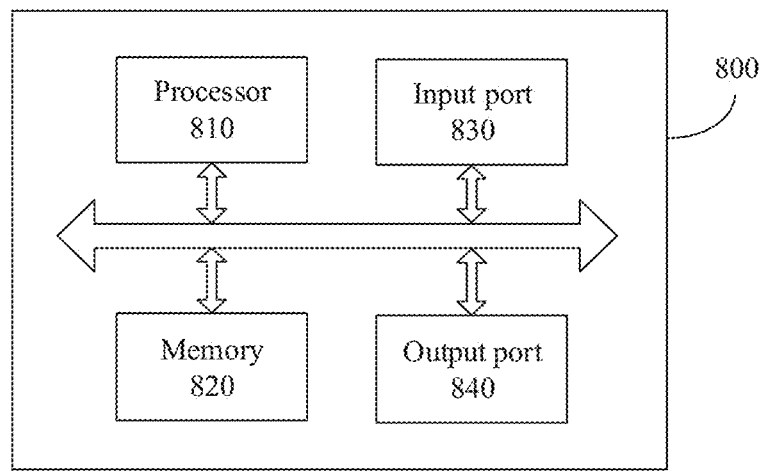
FIG. 8 is a schematic structural diagram of still another example of a network handover apparatus according to this application.

According to the foregoing method, FIG. 8 is a schematic diagram 1 of a network handover apparatus (which may also be referred to as a device) 800 according to an embodiment of this application. As shown in FIG. 8, the apparatus 800 may be an access device (for example, the access device #1), or may be a chip or a circuit, for example, a chip or a circuit that may be disposed on the terminal device.

The apparatus 800 may include a processor 810 (namely, an example of a processing unit) and a memory 820. The memory 820 is configured to store instructions, and the processor 810 is configured to execute the instructions stored in the memory 820, so that the apparatus 800 implements the steps performed by the access device #1 in the foregoing method (for example, the method 200, the method 300, or the method 400).

Further, the apparatus 800 may further include an input port 830 (namely, an example of a communications unit) and an output port 840 (namely, another example of the communications unit). Further, the processor 810, the memory 820, the input port 830, and the output port 840 may communicate with each other through an internal connection path, to transmit a control signal and/or a data signal.

The memory 820 is configured to store a computer program. The processor 810 may be configured to invoke the computer program from the memory 820 and run the computer program, to control the input port 830 to receive a signal, and control the output port 840 to send a signal, to complete the steps performed by the terminal device in the foregoing method.

The memory 820 may be integrated into the processor 810, or may be separated from the processor 810.

Optionally, if the apparatus 800 is a terminal device, the input port 830 is a receiver and the output port 840 is a transmitter. The receiver and the transmitter may be a same physical entity or different physical entities. When being a same physical entity, the receiver and the transmitter may be collectively referred to as a transceiver.

Optionally, if the apparatus 800 is a chip or a circuit, the input port 830 is an input interface and the output port 840 is an output interface.

In an implementation, it may be considered that functions of the input port 830 and the output port 840 are implemented by using a transceiver circuit or a dedicated transceiver chip. It may be considered that the processor 810 is implemented by using a dedicated processing chip, a processing circuit, a processor, or a general-purpose chip.

In another implementation, it may be considered that the control device provided in this embodiment of this application is implemented by using a general-purpose computer. To be specific, program code that is used to implement functions of the processor 810, the input port 830, and the output port 840 is stored in the memory 820, and a general-purpose processor implements the functions of the processor 810, the input port 830, and the output port 840 by executing the code in the memory 820.

The modules or units in the apparatus 800 that are listed above may be configured to perform the actions or processing processes performed by the access device #1 in the method 200, 300, or 400. To avoid repetition, detailed descriptions are omitted herein.

For concepts, explanations, detailed descriptions, and other steps of the apparatus 800 that are related to the technical solutions provided in the embodiments of this application, refer to the descriptions of the content in the foregoing methods or other embodiments. Details are not described herein again.

In a possible implementation, with development of a system-on-chip (System-on-chip. SoC) technology, all or some functions of the apparatus 10 are implemented by using the SoC technology, for example, implemented by using an access device function chip. The access device function chip integrates components such as a processor, a memory, and a communications interface. A program of a function related to the access device is stored in the memory. The processor executes the program to implement a function related to the access device. Optionally, the access device function chip can also read a memory outside the chip to implement a function related to the access device.

It should be understood that a structure of the apparatus 800 shown in FIG. 8 is merely a possible form, but should not constitute any limitation to the embodiments of this application. According to this application, there may be an access device structure in another form in the future.

Figure 9:
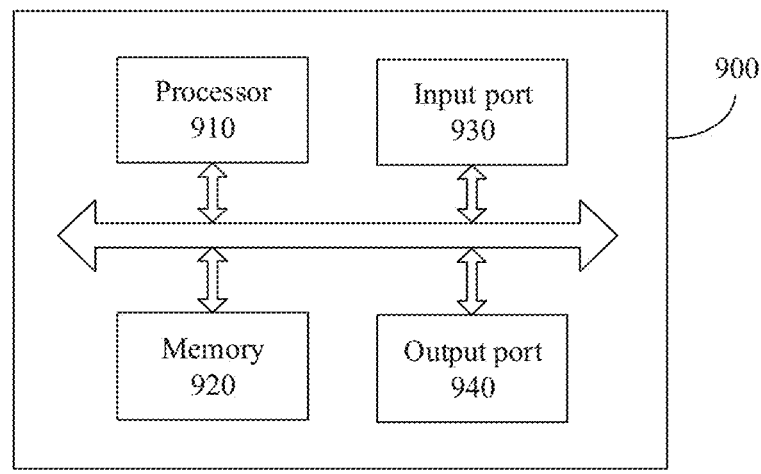
FIG. 9 is a schematic structural diagram of still another example of a network handover apparatus according to this application.

According to the foregoing method, FIG. 9 is a schematic diagram 1 of a network handover apparatus (which may also be referred to as a device) 900 according to an embodiment of this application. As shown in FIG. 9, the apparatus 900 may be an access management device (for example, the access management device #1), or may be a chip or a circuit, for example, a chip or a circuit that may be disposed on the access management device.

The apparatus 900 may include a processor 910 (namely, an example of a processing unit) and a memory 920. The memory 920 is configured to store instructions, and the processor 910 is configured to execute the instructions stored in the memory 920, so that the apparatus 900 implements the steps performed by the access management device #2 in the foregoing method (for example, the method 200, the method 300, or the method 400).

Further, the apparatus 900 may further include an input port 930 (namely, an example of a communications unit) and an output port 940 (namely, another example of the communications unit). Further, the processor 910, the memory 920, the input port 930, and the output port 940 may communicate with each other through an internal connection path, to transmit a control signal and/or a data signal.

The memory 920 is configured to store a computer program. The processor 910 may be configured to invoke the computer program from the memory 920 and run the computer program, to control the input port 930 to receive a signal, and control the output port 940 to send a signal, to complete the steps performed by the terminal device in the foregoing method.

The memory 920 may be integrated into the processor 910, or may be separated from the processor 910.

Optionally, if the apparatus 900 is a terminal device, the input port 930 is a receiver and the output port 940 is a transmitter. The receiver and the transmitter may be a same physical entity or different physical entities. When being a same physical entity, the receiver and the transmitter may be collectively referred to as a transceiver.

Optionally, if the apparatus 900 is a chip or a circuit, the input port 930 is an input interface and the output port 940 is an output interface.

In an implementation, it may be considered that functions of the input port 930 and the output port 940 are implemented by using a transceiver circuit or a dedicated transceiver chip. It may be considered that the processor 910 is implemented by using a dedicated processing chip, a processing circuit, a processor, or a general purpose chip.

In another implementation, it may be considered that the control device provided in this embodiment of this application is implemented by using a general-purpose computer. To be specific, program code that is used to implement functions of the processor 910, the input port 930, and the output port 940 is stored in the memory 920, and a general-purpose processor implements the functions of the processor 910, the input port 930, and the output port 940 by executing the code in the memory 920.

The modules or units in the apparatus 900 that are listed above may be configured to perform the actions or processing processes performed by the access management device #1 in the method 200, 300, or 400. To avoid repetition, detailed descriptions are omitted herein.

For concepts, explanations, detailed descriptions, and other steps of the apparatus 900 that are related to the technical solutions provided in the embodiments of this application, refer to the descriptions of the content in the foregoing methods or other embodiments. Details are not described herein again.

In a possible implementation, with development of a system-on-chip (System-on-chip, SoC) technology, all or some functions of the apparatus 10 are implemented by using the SoC technology, for example, implemented by using an access management device function chip. The access management device function chip integrates components such as a processor, a memory, and a communications interface. A program of a function related to the access management device is stored in the memory. The processor executes the program to implement a function related to the access management device. Optionally, the access management device function chip can also read a memory outside the chip to implement a function related to the access management device.

It should be understood that a structure of the apparatus 900 shown in FIG. 9 is merely a possible form, but should not constitute any limitation to the embodiments of this application. According to this application, there may be an access management device structure in another form in the future.

According to the method provided in the embodiments of this application, an embodiment of this application further provides a communications system, including the foregoing terminal device, forwarding device, interworking device, access device, and access control device.

Figure 10:
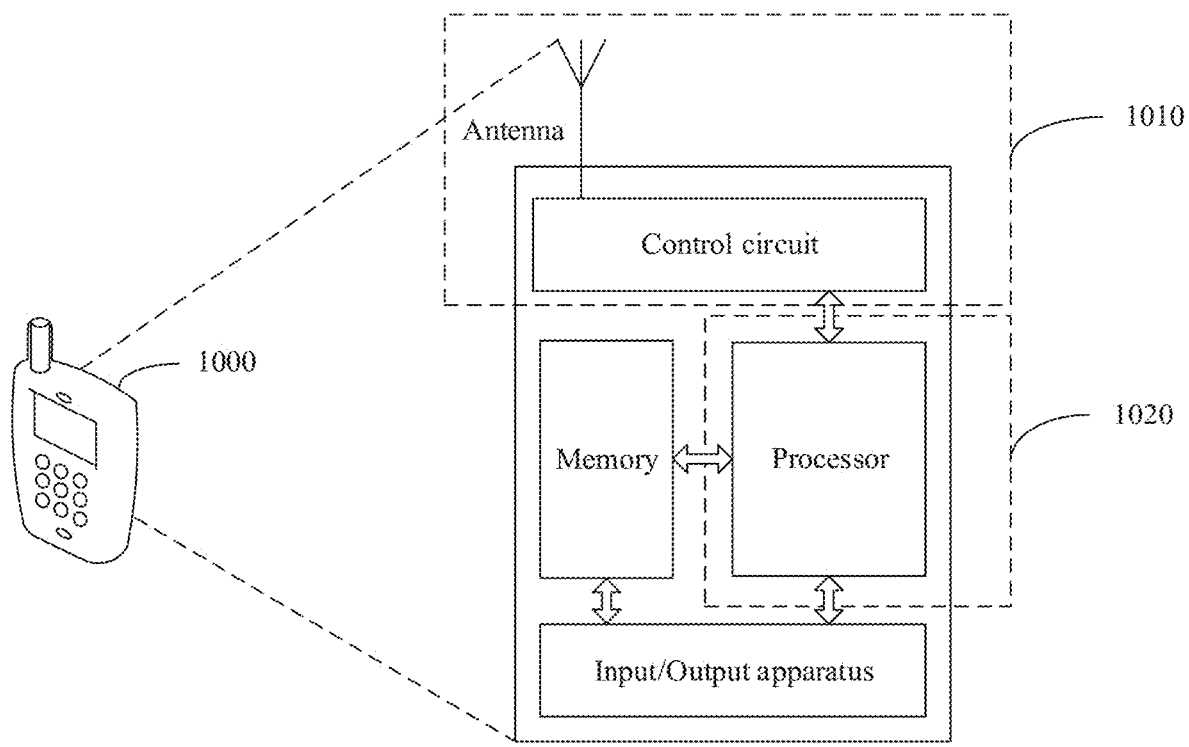
FIG. 10 is a schematic structural diagram of a terminal device according to this application.

FIG. 10 is a schematic structural diagram of a terminal device 1000 according to this application. The apparatus 500 may be configured in the terminal device 1000, or the apparatus 500 itself may be the terminal device 1000. In other words, the terminal device 1000 may perform an action performed by the terminal device in the method 200, the method 300, or the method 400.

For ease of description, FIG. 10 shows only main components of the terminal device. As shown in FIG. 10, the terminal device 1000 includes a processor, a memory, a control circuit, an antenna, and an input/output apparatus.

The processor is mainly configured to: process a communications protocol and communications data, control the entire terminal device, execute a software program, and process data of the software program, for example, is configured to support the terminal device in performing the actions described in the foregoing embodiments of the method for transmitting a precoding matrix indicator. The memory is mainly configured to store the software program and the data, for example, store the codebook described in the foregoing embodiments. The control circuit is mainly configured to: perform conversion between a baseband signal and a radio frequency signal, and process the radio frequency signal. A combination of the control circuit and the antenna may also be referred to as a transceiver that is mainly configured to receive/send a radio frequency signal in a form of an electromagnetic wave. The input/output apparatus such as a touchscreen, a display, or a keyboard is mainly configured to receive data entered by a user and output data to the user.

After the terminal device is powered on, the processor may read a software program in a storage unit, explain and execute an instruction of the software program, and process data of the software program. When data needs to be sent in a wireless manner, after performing baseband processing on the to-be-sent data, the processor outputs a baseband signal to a radio frequency circuit. After performing radio frequency processing on the baseband signal, the radio frequency circuit sends a radio frequency signal to the outside through the antenna in an electromagnetic wave form. When data is sent to the terminal device, the radio frequency circuit receives the radio frequency signal by using the antenna, converts the radio frequency signal into a baseband signal, and outputs the baseband signal to the processor, and the processor converts the baseband signal into data and processes the data.

A person skilled in the art may understand that for ease of description, FIG. 10 shows only one memory and one processor. An actual terminal device may have a plurality of processors and a plurality of memories. The memory may alternatively be referred to as a storage medium, a storage device, or the like. This is not limited in the embodiments of this application.

For example, the processor may include a baseband processor and a central processing unit. The baseband processor is mainly configured to process the communication protocol and the communication data. The central processing unit is mainly configured to control the entire terminal device, execute the software program, and process the data of the software program. The processor in FIG. 10 integrates functions of the baseband processor and the central processing unit. A person skilled in the art may understand that the baseband processor and the central processing unit may be respectively independent processors, and are interconnected by using technologies such as a bus. A person skilled in the art may understand that the terminal device may include a plurality of baseband processors to adapt to different network standards, the terminal device may include a plurality of central processing units to improve a processing capability of the terminal device, and components of the terminal device may be connected through various buses. The baseband processor may also be expressed as a baseband processing circuit or a baseband processing chip. The central processing unit may also be expressed as a central processing circuit or a central processing chip. A function of processing the communication protocol and the communication data may be built in the processor, or may be stored in the storage unit in a form of a software program. The processor executes the software program to implement a baseband processing function.

For example, in this embodiment of this application, the antenna and the control circuit that have receiving and sending functions may be considered as a transceiver unit 1010 of the terminal device 1000, and the processor having a processing function may be considered as a processing unit 1020 of the terminal device 1000. As shown in FIG. 10, the terminal device 1000 includes the transceiver unit 1010 and the processing unit 1020. The transceiver unit may also be referred to as a transceiver, a transceiver machine, a transceiver apparatus, or the like. Optionally, a component for implementing a receiving function in the transceiver unit 1010 may be considered as a receiving unit, and a component for implementing a sending function in the transceiver unit 1010 may be considered as a sending unit. In other words, the transceiver unit 1010 includes the receiving unit and the sending unit. For example, the receiving unit may also be referred to as a receiver machine, a receiver, a receive circuit, or the like, and the sending unit may be referred to as a transmitter machine, a transmitter, a transmit circuit, or the like.

The processor 1020 is configured to execute instructions stored in the memory, so that the terminal device 1000 implements the steps performed by the terminal device in the foregoing method, for example, the steps performed by the terminal device in the method 200, the method 300, or the method 400.

In an implementation, the processor 1020 may invoke a program in the memory to control a unit such as a transceiver unit 1010 to enable the terminal device 1000 to set up a first tunnel to a first interworking device before the terminal device 1000 is handed over from a first network to a second network. A communication identifier, in the first tunnel, of the terminal device is a first identifier, and the first identifier is an identifier used in the first network by the terminal device. The first interworking device is an interface device that is in the first network and oriented toward a network other than the first network: and is configured to:

obtain a second identifier after the terminal device is handed over from the first network to the second network, and control the transceiver unit 1010 to send an update request to the first interworking device, where the update request is used to request to update the communication identifier to the second identifier, and the second identifier is an identifier used in the second network by the terminal device.

Optionally, the processor 1020 is configured to control the transceiver unit 1010 to: before the terminal device 1000 is handed over from the first network to the second network, send a first message to an access management device of the second network through a second interworking device, where the first message is used to request to register the terminal device with the second network, and the second interworking device is an interface device that is in the second network and oriented toward a network other than the second network; configured to control the transceiver unit 1010 to receive a response message from the access management device of the second network through the second interworking device, where the response message includes a temporary identifier allocated by the access management device of the second network to the terminal device: and configured to control the transceiver unit 1010 to: when the terminal device 1000 is handed over from the first network to the second network, send a second message to the access management device of the second network, where the second message is used to request to register the terminal device with the second network, and the second message includes the temporary identifier.

Optionally, the processor 1020 is configured to control the transceiver unit 1010 to send a third registration request to the access management device of the first network through the first interworking device before the terminal device 1000 is handed over from the first network to the second network.

Optionally, the third registration request includes pre-handover indication information, and the pre-handover indication information is used to indicate that the terminal device needs to be handed over to the second network.

Optionally, the processor 1020 is configured to control the transceiver unit 1010 to indicate, before the terminal device 1000 is handed over from the first network to the second network, the first interworking device to set up a first channel to a forwarding device of the first network, where the first channel belongs to a session of the terminal device.

Optionally, the processor 1020 is configured to control the transceiver unit 1010 to send a first cache indication to the first interworking device, where the first cache indication is used to indicate the first interworking device to cache received first downlink data of the first channel.

Optionally, the processor 1020 is configured to control the transceiver unit 1010 to send trigger information to the forwarding device of the first network, where the trigger information is used to indicate the forwarding device of the first network to send downlink data of the terminal device through the first channel.

Optionally, the processor 1020 is configured to control the transceiver unit 1010 to send a reservation indication, where the reservation indication is used to request to reserve a second channel, the second channel is a channel between an access device of the first network and the forwarding device of the first network, and the first channel and the second channel belong to a same session.

Optionally, the processor 1020 is configured to control the transceiver unit 1010 to: before the terminal device 1000 is handed over from the first network to the second network, send a forwarding tunnel setup request, where the forwarding tunnel setup request is used to request to set up, between the access device of the first network and the first interworking device, a forwarding tunnel for transmitting the downlink data of the terminal device.

Optionally, the tunnel setup request includes a measurement report of the second network.

Optionally, the processor 1020 is configured to control the transceiver unit 1010 to send a second cache indication to the first interworking device, where the second cache indication is used to indicate the first interworking device to cache second downlink data received through the forwarding tunnel.

In another implementation, optionally, the processor 1020 is configured to control the transceiver unit 1010 to: before the terminal device 1000 is handed over from the first network to the second network, send a first message to an access management device of the second network through a second interworking device, where the first message is used to request to register the terminal device with the second network, and the second interworking device is an interface device that is in the second network and oriented toward a network other than the second network; and configured to control the transceiver unit 1010 to receive a response message from the access management device of the second network through the second interworking device, where the response message includes a temporary identifier allocated by the access management device of the second network to the terminal device. Optionally, the processor 1020 is configured to control the transceiver unit 1010 to: when the terminal device 1000 is handed over from the first network to the second network, send a second message to the access management device of the second network, where the second message is used to request to register the terminal device with the second network, and the second message includes the temporary identifier.

The foregoing listed functions and actions of the modules or units in the terminal device 1000 are merely examples for description. The modules or units in the terminal device 1000 may be configured to perform the actions or processing processes performed by the terminal device (for example, the terminal device #A, the terminal device #1, or the terminal device #a) in the foregoing method. Herein, to avoid repetition, detailed descriptions thereof are omitted.

For concepts, explanations, detailed descriptions, and other steps of the terminal device 1000 that are related to the technical solutions provided in the embodiments of this application, refer to the descriptions of the content in the foregoing methods or other embodiments. Details are not described herein again.

It should be understood that, the processor in the embodiments of this application may be a central processing unit (central processing unit, CPU), or may further be another general-purpose processor, a digital signal processor (digital signal processor, DSP), an application-specific integrated circuit (application-specific integrated circuit, ASIC), a field programmable gate array (field programmable gate array, FPGA), or another programmable logic device, discrete gate or transistor logic device, discrete hardware component, or the like. The general-purpose processor may be a microprocessor, or the processor may be any conventional processor, or the like.

It should be further understood that the memory in the embodiments of this application may be a volatile memory or a nonvolatile memory, or may include a volatile memory and a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM) that is used as an external cache. Through example but not limitative description, many forms of random access memories (random access memory, RAM) may be used, for example, a static random access memory (static RAM, SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

All or some of the foregoing embodiments may be implemented by software, hardware, firmware, or any combination thereof. When software is used to implement the embodiments, all or some of the foregoing embodiments may be implemented in a form of a computer program product. The computer program product includes one or more computer instructions or computer programs. When the computer instructions or the computer programs are loaded or executed on a computer, all or some of the procedures or functions according to the embodiments of this application are generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

It should be understood that the term "and/or" in this specification describes only an association relationship between associated objects and represents that three relationships may exist. For example, A and/or B may represent the following three cases: Only A exists, both A and B exist, and only B exists. In addition, the character "/" in this specification usually represents an "or" relationship between the associated objects.

It should be understood that, in the embodiments of this application, sequence numbers of the foregoing processes do not mean execution sequences. The execution sequences of the processes should be determined based on functions and internal logic of the processes, and should not constitute any limitation to implementation processes of the embodiments of this application.

A person of ordinary skill in the art may be aware that units, algorithms, and steps in the examples described with reference to the embodiments disclosed in this specification can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application. It may be clearly understood by the person skilled in the art that, for convenience and brevity of description, for specific working processes of the system, apparatus, and units described in the foregoing, refer to corresponding processes in the foregoing method embodiments. Details are not described herein again. In the several embodiments provided in this application, it should be understood that the disclosed system, apparatus, and method may be implemented in other manners. For example, the apparatus embodiments described in the foregoing are only examples. For example, division of the units is only a type of division of logical functions, and may be another manner of division during actual implementation. For example, a plurality of units or components may be combined or integrated into another system, or some features may be ignored or may not be performed. In addition, the displayed or discussed mutual couplings or direct couplings or communication connections may be implemented through some interfaces. The indirect couplings or communication connections between the apparatuses or units may be implemented in an electrical form, a mechanical form, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments. In addition, function units in the embodiments of this application may be integrated into one processing unit, or each of the units may exist alone physically, or two or more units may be integrated into one unit. When the functions are implemented in a form of a software functional unit and sold or used as an independent product, the functions may be stored in a computer-readable storage medium. Based on such an understanding, the technical solutions of this application essentially, or the part contributing to a current technology, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but the protection scope of this application is not limited thereto. Any variation or replacement readily figured out by the person skilled in the art within the technical scope disclosed in this application shall fall within the protection scope of this application. Therefore, the protection scope of this application shall be subject to the protection scope of the claims.

What is claimed is:

1. A network handover method, comprising:
    before a terminal device is handed over from a first network to a second network, setting up, by the terminal device, a first tunnel to a first interworking device, wherein a communication identifier, of the terminal device, in the first tunnel is a first identifier, the first identifier is an identifier used in the first network by the terminal device, and the first interworking device is an interface device that is in the first network and connected to a network other than the first network; and
    after the terminal device is handed over from the first network to the second network, obtaining, by the terminal device, a second identifier that is an identifier used in the second network by the terminal device and;
    sending an update request to the first interworking device, wherein the update request includes a request to update the communication identifier to the second identifier.

2. The method according to claim 1, wherein the method further comprises:
    before the terminal device is handed over from the first network to the second network, sending, by the terminal device, a first message to an access management device of the second network through a second interworking device, wherein the first message includes a request to register the terminal device with the second network, and the second interworking device is an interface device that is in the second network and oriented toward a network other than the second network;
    receiving, by the terminal device, a response message from the access management device of the second network through the second interworking device, wherein the response message comprises a temporary identifier allocated by the access management device of the second network to the terminal device; and
    in response to the terminal device being handed over from the first network to the second network, sending, by the terminal device, a second message to the access management device of the second network, wherein the second message includes a request to register the terminal device with the second network, and the second message comprises the temporary identifier.

3. The method according to claim 1, wherein the method further comprises:
    before the terminal device is handed over from the first network to the second network, sending, by the terminal device, a registration request to an access management device of the first network through the first interworking device.

4. The method according to claim 3, wherein the registration request comprises pre-handover indication information, and the pre-handover indication information indicates that the terminal device needs to be handed over to the second network.

5. The method according to claim 1, wherein the method further comprises:
    before the terminal device is handed over from the first network to the second network, sending, by the terminal device, a channel setup request, wherein the channel setup request includes a request to set up a first channel between the first interworking device and a forwarding device of the first network, and the first channel belongs to a session of the terminal device.

6. The method according to claim 5, wherein the method further comprises:
    sending, by the terminal device, a first cache indication to the first interworking device, wherein the first cache indication indicates that the first interworking device cache received first downlink data of the first channel.

7. A network handover apparatus, comprising:
a memory storage comprising instructions; and one or more processors in communication with the memory, wherein the one or more processors execute the instructions to:

before a terminal device is handed over from a first network to a second network, set up a first tunnel to a first interworking device, wherein a communication identifier, of the terminal device, in the first tunnel is a first identifier, the first identifier is an identifier used in the first network by the terminal device, and the first interworking device is an interface device that is in the first network and oriented toward a network other than the first network; and after the terminal device is handed over from the first network to the second network, obtain a second identifier that is an identifier used in the second network by the terminal device and;

send an update request to the first interworking device, wherein the update request includes a request to update the communication identifier to the second identifier.

8. The apparatus according to claim 7, wherein the one or more processors further execute the instructions to: before the terminal device is handed over from the first network to the second network, send a first message to an access management device of the second network through a second interworking device, wherein the first message is a request to register the terminal device with the second network, and the second interworking device is an interface device that is in the second network and oriented toward a network other than the second network; configured to receive a response message from the access management device of the second network through the second interworking device, wherein the response message comprises a temporary identifier allocated by the access management device of the second network to the terminal device; and configured to: in response to the terminal device being handed over from the first network to the second network, send a second message to the access management device of the second network, wherein the second message includes a request to register the terminal device with the second network, and the second message comprises the temporary identifier.

9. The apparatus according to claim 7, wherein the one or more processors further execute the instructions to: send a registration request to the access management device of the first network through the first interworking device before the terminal device is handed over from the first network to the second network.

10. The apparatus according to claim 7, wherein the one or more processors further execute the instructions to: indicate, before the terminal device is handed over from the first network to the second network, the first interworking device to set up a first channel to a forwarding device of the first network, wherein the first channel belongs to a session of the terminal device.

11. The apparatus according to claim 10, wherein the one or more processors further execute the instructions to: unit send a first cache indication to the first interworking device, wherein the first cache indication indicates that the first interworking device cache received first downlink data of the first channel.

12. The apparatus according to claim 10, wherein the one or more processors further execute the instructions to: send trigger information to the forwarding device of the first network, wherein the trigger information indicates that the forwarding device of the first network send downlink data of the terminal device through the first channel.

13. The apparatus according to claim 10, wherein the one or more processors further execute the instructions to: send a reservation indication, wherein the reservation indication includes a request to reserve a second channel, the second channel is a channel between an access device of the first network and the forwarding device of the first network, and the first channel and the second channel belong to a same session.

14. The apparatus according to claim 7, wherein the one or more processors further execute the instructions to: before the terminal device is handed over from the first network to the second network, send a forwarding tunnel setup request, wherein the forwarding tunnel setup request includes a request to set up, between an access device of the first network and the first interworking device, a forwarding tunnel for transmitting the downlink data of the terminal device.

15. The apparatus according to claim 14, wherein the one or more processors further execute the instructions to: send a second cache indication to the first interworking device, wherein the second cache indication indicates that the first interworking device cache second downlink data received through the forwarding tunnel.

16. A network handover apparatus, comprising:
a memory storage comprising instructions; and
one or more processors in communication with the memory, wherein the one or more processors execute the instructions to:

set up a first tunnel from a first interworking device to a terminal device in a first network, wherein a communication identifier, of the terminal device, in the first tunnel is a first identifier, the first identifier is an identifier used in the first network by the terminal device, and the apparatus is an interface device that is in the first network and oriented toward a network other than the first network; and receive an update request sent by the terminal device, wherein the update request includes a request to update the communication identifier to a second identifier that is an identifier used in a second network by the terminal device, wherein update the communication identifier, of the terminal device, in the first tunnel to the second identifier based on the update request.

17. The apparatus according to claim 16, wherein the one or more processors further execute the instructions to: set up a first channel to a forwarding device of the first network, wherein the first channel belongs to a session of the terminal device;

cache first downlink data received through the first channel; and send the first downlink data to the terminal device through the first tunnel after the communication identifier, of the terminal device, in the first tunnel is updated to the second identifier.

18. The apparatus according to claim 17, wherein the one or more processors further execute the instructions to: unit receive a first cache indication sent by the terminal device, wherein the first cache indication indicates that the first interworking device cache the first downlink data received through the first channel; and unit cache, unit the first downlink data based on the first cache indication.

19. The apparatus according to claim 16, wherein the one or more processors further execute the instructions to: unit set up a forwarding tunnel to the access device of the first network, wherein the forwarding tunnel is configured to transmit second downlink data of the terminal device;

unit cache the second downlink data received through the forwarding tunnel; and unit send the second downlink data to the terminal device through the first tunnel after the communication identifier, of the terminal device, in the first tunnel is updated to the second identifier.

20. The apparatus according to claim 19, wherein the one or more processors further execute the instructions to:

unit receive a second cache indication, wherein the second cache indication indicates that the first interworking device cache the second downlink data received through the forwarding tunnel; and unit cache the second downlink data based on the second cache indication.

\* \* \* \* \*